US010882932B2

(12) United States Patent
Crowther et al.

(10) Patent No.: US 10,882,932 B2
(45) Date of Patent: Jan. 5, 2021

(54) STERICALLY HINDERED METALLOCENES, SYNTHESIS AND USE

(71) Applicant: ExxonMobil Chemical Patents Inc., Baytown, TX (US)

(72) Inventors: Donna J. Crowther, Blairsville, GA (US); Laughlin G. McCullough, League City, TX (US); Jacqueline A. Lovell, Crosby, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/706,088

(22) Filed: Sep. 15, 2017

(65) Prior Publication Data

US 2018/0094088 A1 Apr. 5, 2018

Related U.S. Application Data

(60) Provisional application No. 62/404,570, filed on Oct. 5, 2016.

(51) Int. Cl.

| | |
|---|---|
| ***C08F 4/6592*** | (2006.01) |
| ***C08F 4/02*** | (2006.01) |
| ***C08F 210/16*** | (2006.01) |
| ***C08F 210/02*** | (2006.01) |
| ***C08F 210/14*** | (2006.01) |
| *C08F 4/659* | (2006.01) |

(52) U.S. Cl.

CPC .............. *C08F 210/02* (2013.01); *C08F 4/02* (2013.01); *C08F 210/14* (2013.01); *C08F 4/65912* (2013.01); *C08F 4/65916* (2013.01)

(58) Field of Classification Search

CPC .............. C08F 4/65925; C08F 4/65916; C08F 4/65912

See application file for complete search history.

(56) References Cited

U.S. PATENT DOCUMENTS

| | | | |
|---|---|---|---|
| 4,110,377 | A | 8/1978 | Clerici et al. |
| 4,814,540 | A | 3/1989 | Watanabe et al. |
| 4,988,764 | A | 1/1991 | Nishio et al. |
| 5,444,125 | A | 8/1995 | Tomita et al. |
| 5,498,809 | A | 3/1996 | Emert et al. |
| 5,705,577 | A | 1/1998 | Rossi et al. |
| 5,811,379 | A | 9/1998 | Rossi et al. |
| 5,859,159 | A | 1/1999 | Rossi et al. |
| 5,936,041 | A | 8/1999 | Diana et al. |
| 6,117,962 | A | 9/2000 | Weng et al. |
| 6,225,432 | B1 | 5/2001 | Weng et al. |
| 6,255,426 | B1 | 7/2001 | Lue et al. |
| 6,897,261 | B1 | 5/2005 | Machida et al. |
| 7,294,681 | B2 | 11/2007 | Jiang et al. |
| 7,524,910 | B2 | 4/2009 | Jiang et al. |
| 7,790,810 | B2 | 9/2010 | Coates et al. |
| 8,318,998 | B2 | 11/2012 | Crowther et al. |
| 8,993,702 | B2 | 3/2015 | Crowther et al. |
| 2005/0159299 | A1 | 7/2005 | Rodriguez et al. |
| 2009/0198089 | A1 | 8/2009 | Burton et al. |
| 2009/0318644 | A1 | 12/2009 | Brant et al. |
| 2009/0318646 | A1 | 12/2009 | Brant et al. |
| 2009/0318664 | A1 | 12/2009 | Yang et al. |
| 2010/0113706 | A1 | 5/2010 | Crowther et al. |
| 2010/0170829 | A1 | 7/2010 | Ng et al. |
| 2012/0245313 | A1 | 9/2012 | Crowther et al. |

FOREIGN PATENT DOCUMENTS

| | | | |
|---|---|---|---|
| EP | 0 283 739 | 9/1988 | |
| EP | 0 958 309 | 11/2006 | |
| JP | 4834965 | 12/2011 | |
| JP | 5256115 | 8/2013 | |
| JP | 5456343 | 3/2014 | |
| KR | 2016-0028278 | 3/2016 | ............. F16H 49/00 |
| KR | 10-1711788 | 3/2017 | |
| WO | 95/27717 | 10/1995 | |

(Continued)

OTHER PUBLICATIONS

U.S. Appl. No. 62/629,196, filed Feb. 12, 2018.

(Continued)

*Primary Examiner* — Caixia Lu

(57) ABSTRACT

In at least one embodiment, a catalyst compound is represented by Formula (I):

(I)

where M is a group 4 metal. Each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, halocarbyl or silylcarbyl. At least one of $R^1$ and $R^3$ is not hydrogen. Each X is independently a halide or $C_1$-$C_{50}$ substituted or unsubstituted hydrocarbyl, hydride, amide, alkoxide, sulfide, phosphide, halide, diene, amine, phosphine, ether, or a combination thereof, or two Xs are joined together to form a metallocycle ring, or two Xs are joined to form a chelating ligand, a diene ligand, or an alkylidene.

33 Claims, 6 Drawing Sheets

(56) References Cited

FOREIGN PATENT DOCUMENTS

| | | |
|---|---|---|
| WO | 2008/080081 | 7/2008 |
| WO | 2010/037059 | 4/2010 |
| WO | 2012/134720 | 10/2012 |
| WO | 2012/134721 | 10/2012 |
| WO | 2012/134725 | 10/2012 |
| WO | 2014/052200 | 4/2014 |
| WO | 2015/123164 | 8/2015 |

OTHER PUBLICATIONS

Bhriain et al., "Polymeryl-Exchange Between Ansa-Zirconocene Catalysts for Norbornene-Ethene Copolymerization and Aluminum or Zinc Alkyls", Macromolecules, 2005, vol. 38, No. 6, pp. 2056-2063.
Cherian et al., "Synthesis of Allyl-Terminated Syndiotactic Polypropylene: Macromonomers for the Synthesis of Branched Polyolefins", Macromolecules, 2005, vol. 38, No. 15, pp. 6259-6268.
Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, No. 13, pp. 5425-5435.
Kolodka et al., "Copolymerization of Propylene with Poly(Ethylene-Co-Propylene) Macromonomer and Branch Chain-Length Dependence of Rheological Properties", Macromolecules, 2002, vol. 35, No. 27, pp. 10062-10070.
Markel et al., "Metallocene-Based-Branch—Block Thermoplastic Elastomers", Macromolecules, 2000, vol. 33, No. 23, pp. 8541-8548.
Rossi et al., End Groups in 1-Butene Polymerization Via Methylaluminoxane and Zirconocene Catalyst, Macromolecules, 1995, vol. 28, No. 6, pp. 1739-1749.
Weng et al., Long Chain Branched Isotactic Polypropylene, Macromolecules, 2002, vol. 35, No. 10, pp. 3838-3843.
Crowther et al., "Group 4 Metal Dicarbollide Chemistry. Synthesis, Structure, and Reactivity of Electrophilie Alkyl Complexes (Cp*)(C2B9H11)M(R) (M=Hf, Zr)", JACS, 1991, vol. 113, No. 4, pp. 1455-1457.
Chung, "Synthesis of Functional Polyolefin Copolymers with Graft and Block Structures," Progress in Polymer Science, 2002, vol. 27, No. 1, pp. 39-85.
Jiang et al., "Highly Z-Selective Metathesis Homocoupling of Terminal Olefins," Journal of the American Chemical Society, 2009, vol. 131, No. 46, pp. 16630-16631.
Resconi et al., "Olefin polymerization at bis(pentamethylcyclopentadienyl)zirconium and -hafnium centers: chain-transfer mechanisms," Journal of the American Chemical Society, 1992, vol. 114, No. 3, pp. 1025-1032.
Moscardi et al., "Propene Polymerization with the Isospecific, Highly Regioselective rac-Me2C(3-t-Bu-1-Ind)2ZrCl2/MAO Catalyst. 2. Combined DFT/MM Analysis of Chain Propagation and Chain Release Reactions," Organometallics, 2001, vol. 20, No. 10, pp. 1918-1931.
Janiak et al., "Metallocene Catalysts for Olefin Oligomerization," Macromolecular Symposia, 2006, vol. 236, No. 1, pp. 14-22.
Langston et al., "One_pot Synthesis of Long Chain Branch PP (LCBPP) Using Ziegler_Natta Catalyst and Branching Reagents," Macromolecular Symposia, 2007, vol. 260, No. 1, pp. 34-41.
Jones et al., "Synthesis and reactive blending of amine and anhydride end-functional polyolefins," Polymer, 2004, vol. 45, No. 12, pp. 4189-4201.
Kolodka et al., "Synthesis and Characterization of Long_Chain_ Branched Polyolefins with Metallocene Catalysts: Copolymerization of Ethylene with Poly(ethylene_co_propylene) Macromonomer," Macromolecular Rapid Communications, 2003, vol. 24, No. 4, pp. 311-315.
Weng et al., "Synthesis of vinyl_terminated isotactic poly(propylene)," Macromolecular Rapid Communications, 2000, vol. 21, No. 16, pp. 1103-1107.
Resconi et al., "Chain transfer reactions in propylene polymerization with zirconocene catalysts," Topics in Catalysis, 1999, vol. 7, No. 1-4, pp. 145-163.
U.S. Appl. No. 15/706,088, filed Sep. 15, 2017.
U.S. Appl. No. 15/921,757, filed Mar. 15, 2018.
Foster et al., Aromatic Substituted Group 4 Metallocene Catalysts for the Polymerization of $\alpha$-Olefins, Organometallics, 1996, vol. 15, No. 23, pp. 4951-4953.
International Search Report and Written Opinion for international application No. PCT/US2017/051790 dated Dec. 26, 2017, 13 pgs.
U.S. Appl. No. 62/926,969, filed Oct. 28, 2019, Rapp, et al.

100

200

STERICALLY HINDERED METALLOCENES, SYNTHESIS AND USE

PRIORITY CLAIM

This application claims priority to and benefit of U.S. Ser. No. 62/404,570, filed Oct. 5, 2016 and is incorporated by reference in its entirety.

FIELD OF THE INVENTION

The present disclosure relates to novel catalyst compounds comprising an unbridged group 4 catalyst compound comprising substituted benz[e]indenyl and catalyst systems comprising such catalyst compounds and uses thereof.

BACKGROUND OF THE INVENTION

Because of their robust physical properties, polyolefins are widely used commercially. For example, various types of polyethylenes include high density, low density, and linear low density polyethylenes, which are some of the most commercially useful. Polyolefins are typically prepared with a catalyst that polymerizes olefin monomers. Indeed, olefin polymerization catalysts are in great demand in industry. Hence, there is interest in finding new catalyst systems that increase the commercial usefulness of the catalyst and provide for production of polyolefins, such as polyethylenes, having improved properties over known polyolefin compositions.

A copolymer composition has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

The composition distribution influences the properties of a copolymer composition, for example, stiffness, toughness, environmental stress crack resistance, and heat sealing, among other properties. The composition distribution of a copolymer composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts typically produce compositions with broad composition distributions (BCD), whereas metallocene catalysts typically produce compositions with narrow composition distributions (NCD).

Furthermore, polyolefins, such as polyethylenes, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight ("HMW") fraction of the composition with the improved processing properties of a low molecular weight ("LMW") fraction of the composition. As used herein, "high molecular weight" is defined as a number average molecular weight (Mn) value of 200,000 g/mol or more. "Low molecular weight" is defined as an Mn value of less than 200,000 g/mol.

For example, useful bimodal polyolefin compositions include a first polyolefin having low molecular weight and low comonomer content (i.e., comonomer incorporated into the polyolefin backbone) while a second polyolefin has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR).

There are several methods for producing bimodal or broad molecular weight distribution polyolefins, e.g., melt blending, reactors in series or parallel configuration, or single reactor with bimetallic catalysts. However, these methods, such as melt blending, suffer from the disadvantages brought by the need for complete homogenization of polyolefin compositions and high cost. Furthermore, synthesizing these polyolefin compositions in a mixed catalyst system would involve a first catalyst to catalyze the polymerization of, for example, ethylene under substantially similar conditions as that of a second catalyst while not interfering with the catalysis of polymerization of the second catalyst.

Because of the improved physical properties of compositions with orthogonal composition distributions for commercially desirable products, there exists a need for catalysts and catalyst systems that provide linear low molecular weight, high density polyethylene with low comonomer content. There is further a need for mixed catalyst systems that provide BOCD polyolefin compositions.

SUMMARY OF THE INVENTION

In at least one embodiment, a catalyst compound is represented by Formula (I):

(I)

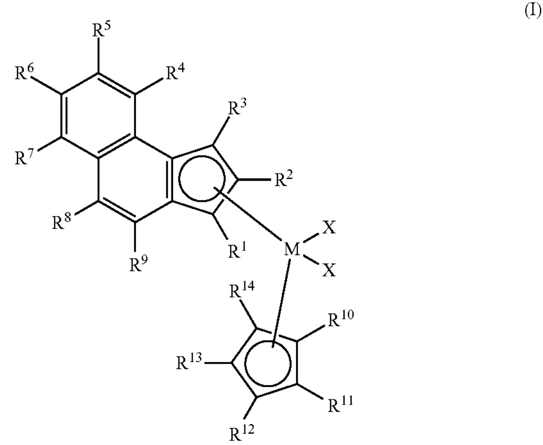

where M is a group 4 metal. Each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, halocarbyl or silylcarbyl, where at least one of $R^1$ and $R^3$ is not hydrogen; each X is independently a halide or $C_1$-$C_{50}$ substituted or unsubstituted hydrocarbyl, hydride, amide, alkoxide, sulfide, phosphide, halide, diene, amine, phosphine, ether, or a combination thereof, or two Xs are joined together to form a metallocycle ring, or two Xs are joined to form a chelating ligand, a diene ligand, or an alkylidene.

In another embodiment, a process for producing a polyolefin composition comprises contacting one or more olefins with a catalyst system comprising: activator and the catalyst compound represented by Formula (I).

In another embodiment, a process for producing a polyolefin composition comprises contacting one or more olefins with a catalyst system comprising: (a) the catalyst compound represented by Formula (I); (b) a bridged or unbridged metallocene catalyst compound other than the catalyst compound represented by Formula (I), and (c) activator.

DETAILED DESCRIPTION OF THE INVENTION

Figure 1:
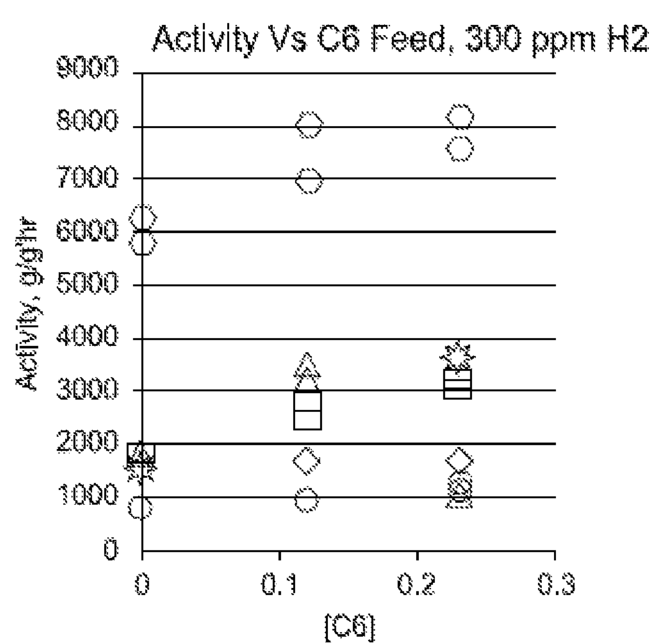
FIG. 1 is a plot of activity versus hexene concentration based on total monomer concentration.

For the purposes of the present disclosure, the numbering scheme for the Periodic Table Groups is used as described in Chemical and Engineering News, 63(5), pg. 27 (1985). Therefore, a "group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}\ hr^{-1}$. Conversion is the amount of monomer that is converted to polymer product, and is reported as mol % and is calculated based on the polymer yield (weight) and the amount of monomer fed into the reactor. Catalyst activity is a measure of how active the catalyst is and is reported as the mass of product polymer (P) produced per mass of supported catalyst (cat) (gP/g supported cat).

An "olefin," alternatively referred to as "alkene," is a linear, branched, or cyclic compound of carbon and hydrogen having at least one double bond. For the purposes of the present disclosure, ethylene shall be considered an α-olefin. When a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

A "catalyst system" is a combination of at least one activator, at least one catalyst compound represented by Formula (I) and an optional second system component, such as a second catalyst compound. The catalyst system may additionally have at least one support material and/or at least one co-activator. When catalyst systems are described as comprising neutral stable forms of the components, it is well understood by one of ordinary skill in the art, that the ionic form of the component is the form that reacts with the monomers to produce polymers. For the purposes of the present disclosure, "catalyst system" includes both neutral and ionic forms of the components of a catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

In the present disclosure, a catalyst may be described as a catalyst precursor, a pre-catalyst compound, catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

For purposes of the present disclosure in relation to catalyst compounds, the term "substituted" means that a hydrogen group has been replaced with a hydrocarbyl group, a heteroatom, or a heteroatom containing group. For example, methyl cyclopentadiene (MeCp) is a Cp group substituted with a methyl group, ethyl alcohol is an ethyl group substituted with an —OH group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may comprise at least one aromatic group. The term "alkoxy" or "alkoxide" preferably means an alkyl ether or aryl ether radical wherein the term alkyl is a $C_1$ to $C_{10}$ alkyl. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The present disclosure describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

The following abbreviations may be used in this disclosure: dme is 1,2-dimethoxyethane, Me is methyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, sMAO is supported methylalumoxane, p-Me is para-methyl, Ph is phenyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The terms "hydrocarbyl radical," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cycloctenyl and the like including their substituted analogues.

The term "aryl" or "aryl group" means a carbon-containing aromatic ring and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The terms "cocatalyst" and "activator" are used herein interchangeably and are defined to be any compound which can activate any one of the catalyst compounds described above by converting the neutral catalyst compound to a catalytically active catalyst compound cation.

A scavenger is a compound that may be added to a catalyst system to facilitate polymerization by scavenging impurities. Some scavengers may also act as activators and may be referred to as co-activators. A co-activator, that is not a scavenger, may also be used in conjunction with an activator in order to form an active catalyst system. In at least one embodiment, a co-activator can be pre-mixed with the transition metal compound to form an alkylated transition metal compound.

In the description herein, the catalyst may be described as a complex, catalyst precursor, a pre-catalyst compound, catalyst compound, transition metal complex or a transition metal compound, and these terms are used interchangeably. A polymerization catalyst system is a catalyst system that can polymerize monomers into polymer.

The term "continuous" means a system that operates without interruption or cessation for a period of time. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. (2000), 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

For purposes of this invention and the claims thereto, an ethylene polymer having a density of 0.86 $g/cm^3$ or less is referred to as an ethylene elastomer or elastomer; an ethylene polymer having a density of more than 0.86 to less than 0.910 $g/cm^3$ is referred to as an ethylene plastomer or plastomer; an ethylene polymer having a density of 0.910 to 0.940 $g/cm^3$ is referred to as a low density polyethylene; and an ethylene polymer having a density of more than 0.940 $g/cm^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 $g/cm^3$).

Polyethylene in an overlapping density range, i.e., 0.890 to 0.930 $g/cm^3$, typically from 0.915 to 0.930 $g/cm^3$, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is measured as described as described below.

Catalyst Compounds

The present disclosure provides a novel unbridged group 4 catalyst compound comprising a substituted benz[e]indenyl.

In at least one embodiment, the present disclosure provides a catalyst compound, and catalyst systems comprising such compounds, represented by Formula (I):

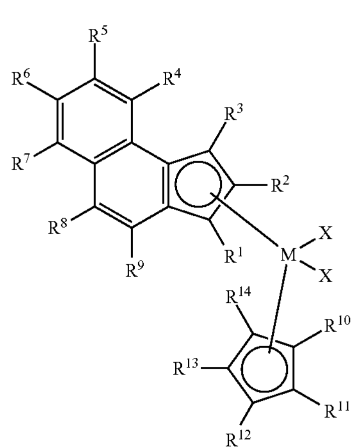

where M is a group 4 metal. Each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, halocarbyl or silylcarbyl. At least one of $R^1$ and $R^3$ is not hydrogen. Alternately, both of $R^1$ and $R^3$ are not hydrogen. Each X is independently a halide or $C_1$-$C_{50}$ substituted or unsubstituted hydrocarbyl, hydride, amide, alkoxide, sulfide, phosphide, halide, diene, amine, phosphine, ether, or a combination thereof, or two Xs are joined together to form a metallocycle ring, or two Xs are joined to form a chelating ligand, a diene ligand, or an alkylidene.

In at least one embodiment, $R^1$ is linear or branched $C_1$-$C_{10}$ (alternately $C_1$-$C_5$) substituted or unsubstituted hydrocarbyl. $R^3$ may be linear or branched $C_1$-$C_{10}$ (alternately $C_1$-$C_5$) substituted or unsubstituted hydrocarbyl. Each of $R^1$ and $R^3$ may be independently linear or branched $C_1$-$C_5$ unsubstituted hydrocarbyl. Each X may be independently a halide or $C_1$-$C_{10}$ (alternately $C_1$-$C_5$) substituted or unsubstituted hydrocarbyl.

In at least one embodiment of the invention, $R^1$ and $R^3$ are linear or branched $C_1$-$C_{10}$ (alternately $C_1$-$C_5$) substituted or unsubstituted hydrocarbyl.

$R^1$ and $R^3$ may be the same or different.

In at least one embodiment of the invention, $R^1$ and $R^3$ are linear or branched $C_1$-$C_{10}$ substituted or unsubstituted alkyl, preferably methyl, ethyl, propyl, butyl, pentyl, hexyl, heptyl, octyl, nonyl, or decyl.

In at least one embodiment of the invention, $R^2$, $R^4$, $R^5$, $R^6$, $R^7$, $R^8$, and $R^9$ are hydrogen or linear or branched $C_1$-$C_{10}$ substituted or unsubstituted alkyl, preferably methyl, ethyl, propyl, butyl, pentyl, hexyl, heptyl, octyl, nonyl, or decyl.

In at least one embodiment of the invention, $R^1$ and $R^3$ are linear or branched $C_1$-$C_{10}$ substituted or unsubstituted alkyl, preferably methyl, ethyl, propyl, butyl, pentyl, hexyl, heptyl, octyl, nonyl or decyl and $R^2$, $R^4$, $R^5$, $R^6$, $R^7$, $R^8$, and $R^9$ are hydrogen.

In at least one embodiment, $R^{10}$ is hydrogen or $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl. Each of $R^{11}$, $R^{12}$, $R^{13}$, and $R^{14}$ may be independently $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl.

In at least one embodiment of the invention, each $R^1$ and $R^3$ is independently hydrogen, linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl, or decyl, where at least one of $R^1$ and $R^3$ is not hydrogen (alternately both are not H); $R^2$, $R^4$, $R^5$, $R^6$, $R^7$, $R^8$, and $R^9$ are hydrogen or linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl; $R^{10}$ is hydrogen or $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl; and each of $R^{11}$, $R^{12}$, $R^{13}$, and $R^{14}$ is independently $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl.

In at least one embodiment of the invention, $R^1$ and $R^3$ are linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl, or decyl; $R^2$, $R^4$, $R^5$, $R^6$, $R^7$, $R^8$, and $R^9$ are hydrogen or linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl; $R^{10}$ is hydrogen or $C_1$-$C_{10}$ substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl; and each of $R^{11}$, $R^{12}$, $R^{13}$, and $R^{14}$ is independently $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl.

In at least one embodiment of the invention, $R^1$ and $R^3$ are hydrogen, linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl, or decyl, where at least 1 of $R^1$ and $R^3$, alternately both of $R^1$ and $R^3$ are not hydrogen; $R^2$, $R^4$, $R^5$, $R^6$, $R^7$, $R^8$, $R^9$, and $R^{10}$ are linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl; $R^{10}$ is hydrogen or $C_1$-$C_{10}$ (alternately $C_1$-$C_5$) substituted or unsubstituted hydrocarbyl, preferably linear or branched $C_1$-$C_{10}$ substituted or unsubstituted alkyl, preferably methyl, ethyl, propyl, butyl, pentyl, hexyl, heptyl, octyl, nonyl or decyl; and each of $R^{11}$, $R^{12}$, $R^{13}$, and $R^{14}$ is independently $C_1$-$C_{10}$ (alternately $C_1$-$C_5$) substituted or unsubstituted hydrocarbyl, preferably linear or branched $C_1$-$C_{10}$ (alternately $C_1$-$C_5$) substituted or unsubstituted alkyl, preferably methyl, ethyl, propyl, butyl, pentyl, hexyl, heptyl, octyl, nonyl or decyl.

Non-limiting species of the catalyst compound represented by Formula (I) are:
(1,3-$Me_2$-benz[e]indenyl)($Me_5$cyclopentadienyl)$HfCl_2$; (1-Me-benz[e]indenyl)($Me_5$cyclopentadienyl)$HfCl_2$; (1-Me-benz[e]indenyl)($Me_4$cyclopentadienyl)$HfCl_2$; (1,3-$Me_2$-benz[e]indenyl)($Me_5$cyclopentadienyl)$HfMe_2$; (1-Me-benz[e]indenyl)($Me_5$cyclopentadienyl)$HfMe_2$; (1-Me-benz[e]indenyl)($Me_4$cyclopentadienyl)$HfMe_2$; (1,3-$Me_2$-benz[e]indenyl)($Me_5$cyclopentadienyl)$ZrCl_2$; (1-Me-benz[e]indenyl)($Me_5$cyclopentadienyl)$ZrCl_2$; (1-Me-benz[e]indenyl)($Me_4$cyclopentadienyl)$ZrCl_2$; (1,3-$Me_2$-benz[e]indenyl)($Me_5$cyclopentadienyl)$ZrMe_2$; (1-Me-benz[e]indenyl)($Me_5$cyclopentadienyl)$ZrMe_2$; (1-Me-benz[e]indenyl)($Me_4$cyclopentadienyl)$ZrMe_2$; (1,3-$Et_2$-benz[e]indenyl)($Me_5$cyclopentadienyl)$ZrCl_2$; (1-Et-benz[e]indenyl)($Me_5$cyclopentadienyl)$ZrCl_2$; (1-Et-benz[e]indenyl)($Me_4$cyclopentadienyl)$ZrCl_2$; (1,3-$Et_2$-benz[e]indenyl)($Me_5$cyclopentadienyl)$ZrMe_2$; (1-Et-benz[e]indenyl)($Me_5$cyclopentadienyl)$ZrMe_2$; (1-Et-benz[e]indenyl)($Me_4$cyclopentadienyl)$ZrMe_2$; (1,3-$Et_2$-benz[e]indenyl)($Me_5$cyclopentadienyl)$HfCl_2$; (1-Et-benz[e]indenyl)($Me_5$cyclopentadienyl)$HfCl_2$; (1-Et-benz[e]indenyl)($Me_4$cyclopentadienyl)$HfCl_2$; (1,3-$Et_2$-benz[e]indenyl)($Me_5$cyclopentadienyl)$HfMe_2$; (1-Et-benz[e]indenyl)($Me_5$cyclopentadienyl)$HfMe_2$; (1-Et-benz[e]indenyl)($Me_4$cyclopentadienyl)$HfMe_2$; (1,3-n-$Pr_2$-benz[e]indenyl)($Me_5$cyclopentadienyl)$ZrCl_2$; (1-n-Pr-benz[e]indenyl)($Me_5$cyclopentadienyl)$ZrCl_2$; (1-n-Pr-benz[e]indenyl)($Me_4$cyclopentadienyl)$ZrCl_2$; (1,3-n-$Pr_2$-benz[e]indenyl)($Me_5$cyclopentadienyl)$ZrMe_2$; (1-n-Pr-benz[e]indenyl)($Me_5$cyclopentadienyl)$ZrMe_2$; (1-n-Pr-benz[e]indenyl)($Me_4$cyclopentadienyl)$ZrMe_2$; (1,3-n-$Pr_2$-benz[e]indenyl)($Me_5$cyclopentadienyl)$HfCl_2$; (1-n-Pr-benz[e]indenyl)($Me_5$cyclopentadienyl)$HfCl_2$; (1-n-Pr-benz[e]indenyl)($Me_4$cyclopentadienyl)$HfCl_2$; (1,3-n-$Pr_2$-benz[e]indenyl)($Me_5$cyclopentadienyl)$HfMe_2$; (1-n-Pr-benz[e]indenyl)($Me_5$cyclopentadienyl)$HfMe_2$; (1-n-Pr-benz[e]indenyl)($Me_4$cyclopentadienyl)$HfMe_2$; (1,3-$Me_2$-benz[e]indenyl)($Me_4$cyclopentadienyl)$HfCl_2$; (3-Me-benz[e]indenyl)($Me_5$cyclopentadienyl)$HfCl_2$; (3-Me-benz[e]indenyl)($Me_4$cyclopentadienyl)$HfCl_2$; (1,3-$Me_2$-benz[e]indenyl)($Me_4$cyclopentadienyl)$HfMe_2$; (3-Me-benz[e]indenyl)($Me_5$cyclopentadienyl)$HfMe_2$; (3-Me-benz[e]indenyl)($Me_4$cyclopentadienyl)$HfMe_2$; (1,3-$Me_2$-benz[e]indenyl)($Me_4$cyclopentadienyl)$ZrCl_2$; (3-Me-benz[e]indenyl)($Me_5$cyclopentadienyl)$ZrCl_2$; (3-Me-benz[e]indenyl)($Me_4$cyclopentadienyl)$ZrCl_2$; (1,3-$Me_2$-benz[e]indenyl)($Me_4$cyclopentadienyl)$ZrMe_2$; (3-Me-benz[e]indenyl)($Me_5$cyclopentadienyl)$ZrMe_2$; (3-Me-benz[e]indenyl)($Me_4$cyclopentadienyl)$ZrMe_2$; (1,3-$Et_2$-benz[e]indenyl)($Me_4$cyclopentadienyl)$ZrCl_2$; (3-Et-benz[e]indenyl)($Me_5$cyclopentadienyl)$ZrCl_2$; (3-Et-benz[e]indenyl)($Me_4$cyclopentadienyl)$ZrCl_2$; (1,3-$Et_2$-benz[e]indenyl)($Me_4$cyclopentadienyl)$ZrMe_2$; (3-Et-benz[e]indenyl)($Me_5$cyclopentadienyl)$ZrMe_2$; (3-Et-benz[e]indenyl)($Me_4$cyclopentadienyl)$ZrMe_2$; (1,3-$Et_2$-benz[e]indenyl)($Me_4$cyclopentadienyl)$HfCl_2$; (3-Et-benz[e]indenyl)($Me_5$cyclopentadienyl)$HfCl_2$; (3-Et-benz[e]indenyl)($Me_4$cyclopentadienyl)$HfCl_2$; (1,3-$Et_2$-benz[e]indenyl)($Me_4$cyclopentadienyl)$HfMe_2$; (3-Et-benz[e]indenyl)($Me_5$cyclopentadienyl)$HfMe_2$; (3-Et-benz[e]indenyl)($Me_4$cyclopentadienyl)$HfMe_2$; (1,3-n-$Pr_2$-benz[e]indenyl)($Me_4$cyclopentadienyl)$ZrCl_2$; (3-n-Pr-benz[e]indenyl)($Me_5$cyclopentadienyl)$ZrCl_2$; (3-n-Pr-benz[e]indenyl)($Me_4$cyclopentadienyl)$ZrCl_2$; (1,3-n-$Pr_2$-benz[e]indenyl)($Me_4$cyclopentadienyl)$ZrMe_2$; (3-n-Pr-benz[e]indenyl)($Me_5$cyclopentadienyl)$ZrMe_2$; (3-n-Pr-benz[e]indenyl)($Me_4$cyclopentadienyl)$ZrMe_2$; (1,3-n-$Pr_2$-benz[e]indenyl)($Me_4$cyclopentadienyl)$HfCl_2$; (3-n-Pr-benz[e]indenyl)($Me_5$cyclopentadienyl)$HfCl_2$; (3-n-Pr-benz[e]indenyl)($Me_4$cyclopentadienyl)$HfCl_2$; (1,3-n-$Pr_2$-benz[e]indenyl)($Me_4$cyclopentadienyl)$HfMe_2$; (3-n-Pr-benz[e]indenyl)($Me_5$cyclopentadienyl)$HfMe_2$; (3-n-Pr-benz[e]indenyl)($Me_4$cyclopentadienyl)$HfMe_2$; (1-Me,3-n-Bu-benz[e]indenyl)($Me_4$cyclopentadienyl) $HfCl_2$; (1-Me,3-n-hexyl-benz[e]indenyl) ($Me_4$cyclopentadienyl)$HfCl_2$; (1-Me,3-n-pentyl-benz[e] indenyl)($Me_4$cyclopentadienyl)$HfCl_2$; (1-Me,3-n-Bu-benz[e]indenyl)($Me_4$cyclopentadienyl) $HfMe_2$; (1-Me,3-n-hexyl-benz[e]indenyl) ($Me_4$cyclopentadienyl)$HfMe_2$; (1-Me,3-n-pentyl-benz[e] indenyl)($Me_4$cyclopentadienyl)$HfMe_2$; (1-Me,3-n-Bu-benz[e]indenyl)($Me_5$cyclopentadienyl) $HfCl_2$; (1-Me,3-n-hexyl-benz[e]indenyl) ($Me_5$cyclopentadienyl)$HfCl_2$; (1-Me,3-n-pentyl-benz[e] indenyl)($Me_5$cyclopentadienyl)$HfCl_2$; (1-Me,3-n-Bu-benz[e]indenyl)($Me_5$cyclopentadienyl) $HfMe_2$; (1-Me,3-n-hexyl-benz[e]indenyl) ($Me_5$cyclopentadienyl)$HfMe_2$; (1-Me,3-n-pentyl-benz[e] indenyl)($Me_5$cyclopentadienyl)$HfMe_2$; (1,3-$Me_2$-benz[e]indenyl)($Me_5$cyclopentadienyl)$TiCl_2$; (1-Me-benz[e]indenyl)($Me_5$cyclopentadienyl)$TiCl_2$; (3-Me-benz[e]indenyl)($Me_5$cyclopentadienyl)$TiCl_2$; (1,3-$Me_2$-benz[e]indenyl)($Me_5$cyclopentadienyl)$TiMe_2$; (1-Me-benz[e]indenyl)($Me_5$cyclopentadienyl)$TiMe_2$; (3-Me-benz[e]indenyl)($Me_5$cyclopentadienyl)$TiMe_2$; (1,3-$Me_2$-benz[e]indenyl)($Me_4$cyclopentadienyl)$TiCl_2$; (1-Me-benz[e]indenyl)($Me_4$cyclopentadienyl)$TiCl_2$; (3-Me-benz[e]indenyl)($Me_4$cyclopentadienyl)$TiCl_2$; (1,3-$Me_2$-benz[e]indenyl)($Me_4$cyclopentadienyl)$TiMe_2$; (1-Me-benz[e]indenyl)($Me_4$cyclopentadienyl)$TiMe_2$; (3-Me-benz[e]indenyl)($Me_4$cyclopentadienyl)$TiMe_2$;

In at least one embodiment, a catalyst system includes the catalyst represented by Formula (I) in addition to a second catalyst compound that is a bridged or unbridged metallocene catalyst compound other than the catalyst compound represented by Formula (I).

The second metallocene catalyst compound may be an unbridged metallocene catalyst compound represented by the formula: $Cp^ACp^BM'X'_n$. Each $Cp^A$ and $Cp^B$ is independently selected from the group consisting of cyclopentadienyl ligands. One or both $Cp^A$ and $Cp^B$ may contain heteroatoms. One or both $Cp^A$ and $Cp^B$ may be substituted by one or more R" groups. M' is selected from the group consisting of Groups 3 through 12 atoms and lanthanide Group atoms. X' is an anionic leaving group. n is 0 or an integer from 1 to 4. R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether. In at least one embodiment, the unbridged metallocene catalyst represented by the formula: $Cp^ACp^BM'X'_n$ produces a polyolefin having a high comonomer content.

Non-limiting species of the second metallocene catalyst compound include bis(n-propylcyclopentadienyl)hafnium dichloride, bis(n-propylcyclopentadienyl)hafnium dimethyl, bis(n-propylcyclopentadienyl)zirconium dichloride, bis(n-propylcyclopentadienyl)zirconium dimethyl, bis(n-propylcyclopentadienyl)titanium dichloride, bis(n-propylcyclopentadienyl)titanium dimethyl, (n-propylcyclopentadienyl, pentamethylcyclopentadienyl)zirconium dichloride, (n-propylcyclopentadienyl, pentamethylcyclopentadienyl)zirconium dimethyl, (n-propylcyclopentadienyl, pentamethylcyclopentadienyl)hafnium dichloride, (n-propylcyclopentadienyl, pentamethylcyclopentadienyl) hafnium dimethyl, (n-propylcyclopentadienyl, pentamethylcyclopentadienyl)titanium dichloride, (n-propylcyclopentadienyl, pentamethylcyclopentadienyl)titanium dimethyl, (n-propylcyclopentadienyl, tetramethylcyclopentadienyl) zirconium dichloride, (n-propylcyclopentadienyl, tetramethylcyclopentadienyl)zirconium dimethyl, (n-propylcyclopentadienyl, tetramethylcyclopentadienyl)hafnium dichloride, (n-propylcyclopentadienyl, tetramethylcyclopentadienyl) hafnium dimethyl, (n-propylcyclopentadienyl, tetramethylcyclopentadienyl)titanium dichloride, (n-propylcyclopentadienyl, tetramethylcyclopentadienyl)titanium dimethyl, bis (cyclopentadienyl)zirconium dichloride, bis (cyclopentadienyl)titanium dichloride, bis (cyclopentadienyl)hafnium dichloride, bis (cyclopentadienyl)zirconium dimethyl, bis (cyclopentadienyl)titanium dimethyl, bis(cyclopentadienyl) hafnium dimethyl, bis(n-butylcyclopentadienyl)hafnium dichloride, bis(n-butylcyclopentadienyl)hafnium dimethyl, bis(n-butylcyclopentadienyl)zirconium dichloride, bis(n-butylcyclopentadienyl)zirconium dimethyl, bis(n-butylcyclopentadienyl)titanium dichloride, bis(n-butylcyclopentadienyl)titanium dimethyl, bis(pentamethylcyclopentadienyl) hafnium dichloride, bis(pentamethylcyclopentadienyl) hafnium dimethyl, bis(pentamethylcyclopentadienyl) zirconium dichloride, bis(pentamethylcyclopentadienyl) zirconium dimethyl, bis(pentamethylcyclopentadienyl) titanium dichloride, bis(pentamethylcyclopentadienyl) titanium dimethyl, bis(1-methyl-3-n-butylcyclopentadienyl) hafnium dichloride, bis(1-methyl-3-n-butylcyclopentadienyl)hafnium dimethyl, bis(1-methyl-3-n-butylcyclopentadienyl)zirconium dichloride, bis(1-methyl-3-n-butylcyclopentadienyl)zirconium dimethyl, bis(1-methyl-3-n-butylcyclopentadienyl)titanium dichloride, and bis(1-methyl-3-n-butylcyclopentadienyl)titanium dimethyl.

In at least one embodiment, the second catalyst is a bridged metallocene catalyst compound represented by the formula: $Cp^A(A)Cp^BM'X'n$. Each $Cp^A$ and $Cp^B$ is independently selected from the group consisting of cyclopentadienyl ligands. One or both $Cp^A$ and $Cp^B$ may contain heteroatoms. One or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from the group consisting of divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkyl thio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkyl thio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

In at least one embodiment, $Cp^A$ and $Cp^B$ is independently selected from cyclopentadienyl, n-propylcyclopentadienyl, pentamethylcyclopentadienyl, tetramethylcyclopentadienyl, and n-butylcyclopentadienyl.

The present disclosure further provides a process to polymerize olefins comprising contacting olefins with a catalyst system including the catalyst compound represented by Formula (I). The olefins may be ethylene, propylene, butene, pentene, hexene, heptene, octene, nonene, decene, undecene, dodecene, or mixtures thereof. The catalyst system may have a second catalyst as described above, an activator, and/or a support material.

The process may occur at a temperature of from about 0° C. to about 300° C., at a pressure in the range of from about 0.35 MPa to about 10 MPa, and/or at a time up to about 300 minutes.

The present disclosure further provides a polyolefin composition that is a multi-modal polyolefin composition comprising a low molecular weight fraction and/or a high molecular weight fraction. In at least one embodiment, the low molecular weight fraction is produced by the catalyst compound represented by Formula (I). The multi-modal polyolefin composition may be produced by the process described above.

In at least one embodiment, in any of the processes described herein one catalyst compound is used, e.g., the catalyst compounds are not different. For purposes of the present disclosure one catalyst compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

In at least one embodiment, two or more different catalyst compounds are present in the catalyst system used herein. In at least one embodiment, two or more different catalyst compounds are present in the reaction zone where the process(es) described herein occur. When two transition metal catalysts are used in one reactor as a mixed catalyst system, the two transition metal compounds are preferably chosen such that the two are compatible. Any suitable screening method, such as by $^1H$ or $^{13}C$ NMR, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst compound represented by Formula (I) and the second catalyst compound may be used in any ratio (A:B). The catalyst compound represented by Formula (I) may be (A) if the second catalyst compound is (B). Alternatively, the catalyst compound represented by Formula (I) may be (B) if the second catalyst compound is (A). Preferred molar ratios of (A) to (B) fall within the range of (A:B) about 1:1000 to about 1000:1, such as between about 1:100 and about 500:1, such as between about 1:10 and about 200:1, such as between about 1:1 and about 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two catalyst compounds, where both are activated with the same activator, useful mole percents, based upon the molecular weight of the catalyst compounds, are between about 10 to about 99.9% of (A) to about 0.1 and about 90% of (B), such as between about 25 and about 99% (A) to about 0.5 and about 50% (B), such as between about 50 and about 99% (A) to about 1 and about 25% (B), such as between about 75 and about 99% (A) to about 1 to about 10% (B).

Methods to Prepare the Catalyst Compounds

Benz[e]indene was purchased from Boulder Scientific. $(CpPr)_2HfMe_2$ and $(1\text{-}EtC_9H_8)_2ZrMe_2$ were purchased from Albemarle. Methylalumoxane (MAO) was purchased from Albemarle as a 30 wt % solution in toluene. $(CpMe_4H)ZrCl_3$ and $(CpMe_5)ZrCl_3$ were both purchased from Strem.

Synthesis of $1,3Me_2$benz[e]indenyl Lithium

Benz[e]indene (6.6 g) was dissolved in $Et_2O$ (100 mL) and deprotonated with nBuLi (3.2 g, 10 M). The volatiles were removed in vacuo and the crude solid product washed with hexane (2×30 mL). All was dissolved in $Et_2O$ (100 mL) and reacted with MeI (30 g) at RT for 12 hr. The crude reaction was washed with $H_2O$ (100 mL) and extracted with additional THF (50 mL). The crude extracts were combined and dried with $MgSO_4$ and reduced to a yellow liquid (6.9 g). All mono-methyl benz[e]indene was dissolved in $Et_2O$ (100 mL) and deprotonated with nBuLi (3.1 g, 10 M). The tan solid was isolated by removing volatiles and was washed with hexane (2×40 mL). All was reacted with MeI and worked up as above to yield a mixture of 1,3- and 1,1-dimethylbenz[e]indene (5.4 g). The crude mixture was dissolved in $Et_2O$ (60 mL) and deprotonated with nBuLi (2.5 g, 10 M). The $Et_2O$ was removed and the solid $1,3Me_2$benz[e]indenyl lithium was washed with hexane (3×50 mL) and dried in vacuo (4.6 g). (See Scheme 1).

Synthesis of (1,3-dimethylbenz[e]indenyl)($CpMe_4$)$ZrMe_2$ $1,3Me_2$benz[e]indenyl lithium (0.62 g) was added to a slurry of $(CpMe_4)ZrCl_3$ (1.6 g) in $Et_2O$ (60 mL). After 2 hr, the reaction was reduced to dryness in vacuo to yield a light yellow solid (2.1 g). All was slurried in toluene (50 mL) and reacted with MeMgI (3 g, 3 M). (See Scheme 1). Dimethoxyethane (2 mL) was added and the reaction was filtered. The filtrate was reduced to 20 mL in volume and pentane (30 mL) was added to induce precipitation. The product was collected as a light yellow solid (1.04 g). $^1$H NMR (400 MHz, $C_6D_6$) ppm; 8.12 (d), 7.55 (d), 7.35 to 7.13 (m's), 5.38 (s), 4.42 (s), 2.17 (s), 2.01 (s), 1.73 (s), 1.71 (s), 1.52 (s), 1.33 (s), −0.75 (s), −1.02 (s).

Synthesis of (1,3-dimethylbenz[e]indenyl)($CpMe_5$)$ZrMe_2$ $1,3Me_2$benz[e]indenyl lithium (1.1 g) was slurried in $Et_2O$ (60 mL) and $CpMe_5)ZrCl_3$ (1.6 g) was added. After 2 hr, the reaction was filtered and the filtrate reduced in vacuo to yield a yellow solid (1.4 g). 1.4 g was slurried in $Et_2O$ (40 mL) and reacted with MeMgI (2.2 g, 3 M) for 12 hr. The $Et_2O$ was removed and the crude dissolved in toluene (50 mL). Dimethoxyethane (2 mL) was added and the reaction was filtered. The filtrate was reduced to 20 mL in volume and pentane (20 mL) was added to induce precipitation. The crude was cooled to −35° C. The product was collected as an off-white solid (0.6 g). $^1$H NMR (400 MHz, $C_6D_6$) ppm; 8.18 (d), 7.81 (d) 7.54 to 7.45 (m), 7.47 (s), 5.21 (s), 2.22 (s), 2.11 (s), 1.88 (s), −1.20 (s), −1.54 (s).

Scheme 1

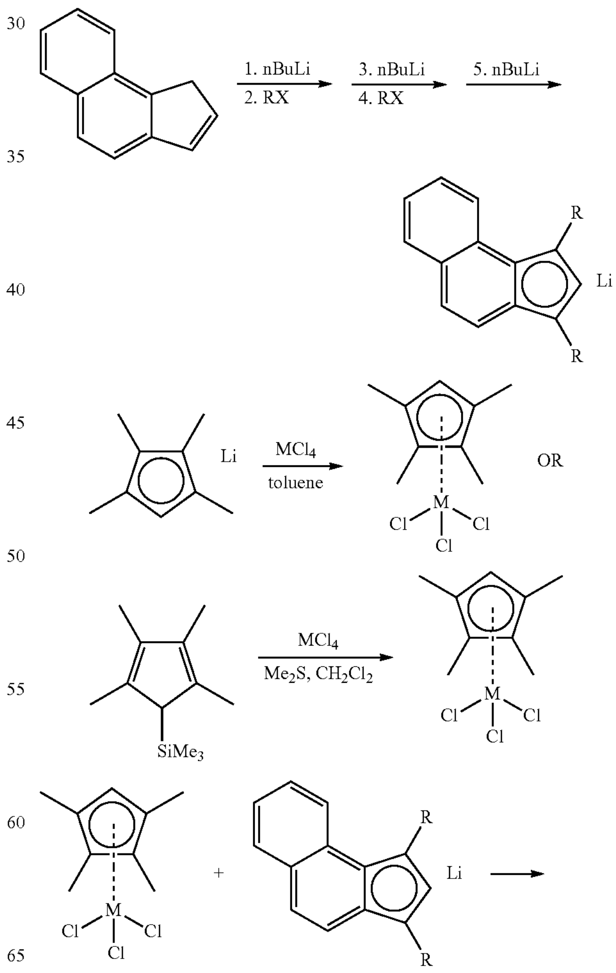

-continued

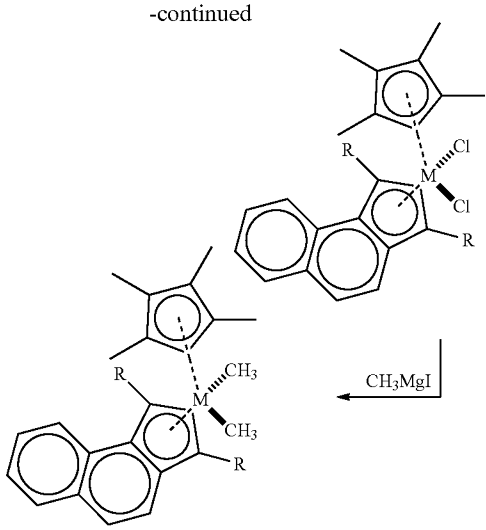

Synthesis of Supported Catalysts:

$(CpPr)_2HfMe_2$-MAO

MAO (6.3 g, 30 wt % Albemarle) was dissolved in 30 mL of toluene. $(CpPr)_2HfMe_2$ (108 mg) was added and the reaction mixture was stirred for 30 min. Silica (4.25 g, ES™757 (PQ Corporation, Conshohocken, Pa.) calcined at 600° C.) was added and the reaction was stirred for 2 hr. Volatiles were removed in vacuo until a free-flowing solid was obtained.

Preparation of SMAO from ES™757 Silica

A solution of methylalumoxane (26 g of 30 wt % in toluene, Albemarle) in toluene (125 mL) was prepared. To this stirring solution was added 20 g ES™757 (PQ Corporation, Conshohocken, Pa.) calcined at 600° C. The slurry was heated to 90° C. for 3 hr and cooled to RT. It was filtered and dried in vacuo to a free flowing solid.

(1,3-dimethylbenz[e]indenyl)$(CpMe_4)ZrMe_2$-SMAO (1,3-dimethylbenz[e]indenyl)$(CpMe_4)ZrMe_2$ (90 mg) was added to a slurry of SMAO-ES™757 (5 g) in 30 mL toluene. The reaction was stirred for 3 hr and the catalyst dried in vacuo until free-flowing.

(1,3-dimethylbenz[e]indenyl)$(CpMe_5)ZrMe_2$-SMAO 1,3-dimethylbenz[e]indenyl$(CpMe_5)ZrMe_2$ (86 mg) was added to a slurry of SMAO-ES™757 (5 g) in 30 mL of toluene. The reaction mixture was stirred for 3 hr at RT. All volatiles were removed in vacuo until a free-flowing solid was obtained.

$(1\text{-}EtC_9H_8)_2ZrMe_2$-SMAO $(1\text{-}EtC_9H_8)_2ZrMe_2$ (83 mg) was added to a slurry of SMAO (5 g) in 30 mL of toluene. The reaction was stirred at RT for 3 hr and volatiles were removed in vacuo until a free-flowing solid was obtained.

$(CpPr)_2HfMe_2$-SMAO $(CpPr)_2HfMe_2$ (200 mg) was added to a slurry of SMAO (10 g) in 50 mL of toluene. The reaction was stirred at RT for 3 hr and volatiles were removed in vacuo until a free-flowing solid was obtained.

Fluorided Supported Catalysts

Siral™-40 (available from Sasol, Germany) was calcined at 460° C. under $N_2$ purge for 4 hr. It was then reacted with $(NH_4)_2SiF_6$ and calcined in air up to 600° C. For example, calcined Siral™-40 (50 g) was combined with $(NH_4)_2SiF_6$ (2.8 g) and heated in air from RT to 200° C. for 3 hrs. It was then heated up to 600° C. for 8 hr and then cooled to RT under $N_2$ flow to obtain fluorided silica, F—Si.

(1,3-dimethylbenz[e]indenyl)$(CpMe_5)ZrMe_2$-F—Si

Methylalumoxane (430 mg, 30 wt % in toluene) was mixed with toluene (10 ml). To this solution was added (1,3-dimethylbenz[e]indenyl)(CpMe)$ZrMe_2$ (17 mg) with stirring for 30 min at RT. Fluorided silica, F—Si, 40 (1 g) was added and the reaction mixture was stirred for 2 hr. All volatiles were removed in vacuo until a free flowing solid was obtained.

(1,3-dimethylbenz[e]indenyl)$(CpMe_4)ZrMe_2$-F—Si

Methylalumoxane (430 mg, 30 wt % in toluene) was mixed with toluene (10 ml). To this solution was added (1,3-dimethylbenz[e]indenyl)$(CpMe_4)ZrMe_2$ (18 mg) with stirring for 30 min at RT. Fluorided silica, F—Si, 40 (1 g) was added and the reaction mixture was stirred for 2 hr. All volatiles were removed in vacuo until a free flowing solid was obtained.

$(CpPr)_2HfMe_2$-F—Si

Methylalumoxane (2.2 g, 30 wt % in toluene) was mixed with toluene (20 ml). To this solution was added $(CpPr)_2HfMe_2$ (80 mg) with stirring for 30 min at RT. Fluorided silica, F—Si, 40 (5 g) was added and the reaction mixture was stirred for 2 hr. All volatiles were removed in vacuo until a free flowing solid was obtained.

Activators

Catalyst systems of the present disclosure may have one or more activators.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion.

The supported catalyst systems may be formed by combining the metal catalyst components with activators and a support, typically silica, in any manner known from the literature. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$; 1-(4-(tris(pentafluorophenyl)borate)-2,3,5,6-tetrafluorophenyl)pyrrolidinium; and tetrakis (pentafluorophenyl)borate, 4-(tris(pentafluorophenyl) borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

In an embodiment the, activator is represented by the formula:

$$(Z)_d^+(A^{d-})$$

wherein Z is (L-H) or a reducible Lewis Acid, L is an neutral Lewis base; H is hydrogen; $(L\text{-}H)^+$ is a Bronsted acid; $A^{d-}$ is a non-coordinating anion having the charge d−; and d is an integer from 1 to 3, preferably Z is $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 BI; WO 94/07928; and WO 95/14044 (the disclosures of which are incorporated herein by reference in their entirety) which discuss the use of an alumoxane in combination with an ionizing activator).

Optional Scavengers or Co-Activators

In addition to these activator compounds, catalyst systems of the present disclosure may include scavengers or co-activators. Scavengers or co-activators include aluminum alkyl or organoaluminum compounds, for example, trimethylaluminum, triethylaluminum, triisobutylaluminum, tri-n-hexylaluminum, tri-n-octylaluminum, diethyl zinc, and diisobutylaluminum hydride (DIBAL-H).

Support Materials

In at least one embodiment, a catalyst system comprises an inert support material. The supported material may be a porous support material, for example, talc, and inorganic oxides. Other support materials include zeolites, clays, organoclays, or any other organic or inorganic support material and the like, or mixtures thereof.

In at least one embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. In at least one embodiment, the support material is selected from $Al_2O_3$, $ZrO_2$, $SiO_2$, $SiO_2/Al_2O_2$, or mixtures thereof. The support material may be fluorided.

As used herein, the phrases “fluorided support” and “fluorided support composition” mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, HF, $BF_3$, $NHF_2$, $NH_4HF_2$, and combinations thereof. In at least one embodiment, ammonium hexafluorosilicate and ammonium tetrafluoroborate are used.

It is preferred that the support material, most preferably an inorganic oxide, has a surface area between about 10 and about 700 $m^2/g$, pore volume between about 0.1 and about 4.0 cc/g and average particle size between about 5 and about 500 m. In at least one embodiment, the surface area of the support material is between about 50 and about 500 $m^2/g$, pore volume between about 0.5 and about 3.5 cc/g and average particle size between about 10 and about 200 m. The surface area of the support material may be between about 100 and about 400 $m^2/g$, pore volume between about 0.8 and about 3.0 cc/g and average particle size between about 5 and about 100 μm. The average pore size of the support material may be between about 10 and about 1000 Å, such as between about 50 and about 500 Å, such as between about 75 and about 350 Å. In at least one embodiment, the support material is a high surface area, amorphous silica (surface area=300 $m^2/gm$; pore volume of 1.65 $cm^3/gm$). Non-limiting example silicas are marketed under the tradenames of DAVISON 952, DAVISON 948, or DAVISON 955 by the Davison Chemical Division of W.R. Grace and Company, Siral-40 by Sasol, and ES-757 by PQ Corporation.

The support material should be dry, that is, free of absorbed water. Drying of the support material can be effected by heating or calcining at between about 100° C. and about 1000° C., such as at least about 600° C. When the support material is silica, it is heated to at least 200° C., such as between about 200° C. and about 850° C., such as about 600° C.; and for a time between about 1 minute and about 100 hours, between about 12 hours and about 72 hours, or between about 24 hours and about 60 hours. The calcined support material should have at least some reactive hydroxyl (OH) groups to produce supported catalyst systems of the present disclosure. The calcined support material is then contacted with at least one polymerization catalyst system comprising, for example, at least one catalyst compound and an activator.

The support material, having reactive surface groups, typically hydroxyl groups, is slurried in a non-polar solvent and the resulting slurry is contacted with a solution of at least one catalyst compound, for example one or two catalyst compounds, and an activator. In at least one embodiment, the slurry of the support material is first contacted with the activator for a period of time between about 0.5 hours and about 24 hours, such as between about 2 hours and about 16 hours, or between about 4 hours and about 8 hours. The solution of the catalyst compound is then contacted with the isolated support/activator. In at least one embodiment, the supported catalyst system is generated in situ. In at least one embodiment, the slurry of the support material is first contacted with the catalyst compound for a period of time between about 0.5 hours and about 24 hours, such as between about 2 hours and about 16 hours, or between about 4 hours and about 8 hours. The slurry of the supported catalyst compound(s) is then contacted with the activator solution.

The mixture of the catalyst, activator and support may be heated to between about 0° C. and about 70° C., such as between about 23° C. and about 60° C., for example room temperature. Contact times may be between about 0.5 hours and about 24 hours, such as between about 2 hours and about 16 hours, or between about 4 hours and about 8 hours.

Suitable non-polar solvents are materials in which all of the reactants used herein, e.g., the activator, and the catalyst compound, are at least partially soluble and which are liquid at reaction temperatures. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Polymerization Processes

Embodiments of the present disclosure include polymerization processes where monomer (such as ethylene or propylene), and optionally comonomer, are contacted with a catalyst system comprising at least one catalyst compound and an activator, as described above. The at least one catalyst compound and activator may be combined in any order, and are combined typically prior to contact with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, olefins include a monomer that is propylene and one or more optional comonomers comprising one or more ethylene or $C_4$ to $C_{40}$ olefin, preferably $C_4$ to $C_{20}$ olefin, or preferably $C_6$ to $C_{12}$ olefin. The $C_4$ to $C_{40}$ olefin monomers may be linear, branched, or cyclic. The $C_4$ to $C_{40}$ cyclic olefin may be strained or unstrained, monocyclic or polycyclic, and may include one or more heteroatoms and/or one or more functional groups. In another preferred embodiment, olefins include a monomer that is ethylene and an optional comonomer comprising one or more of $C_3$ to $C_{40}$ olefin, preferably $C_4$ to $C_{20}$ olefin, or preferably $C_6$ to $C_{12}$ olefin. The $C_3$ to $C_{40}$ olefin monomers may be linear, branched, or cyclic. The $C_3$ to $C_{40}$ cyclic olefins may be strained or unstrained, monocyclic or polycyclic, and may include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbomadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, and dicyclopentadiene.

In at least one embodiment, one or more dienes are present in a polymer produced herein at up to about 10 wt %, such as between about 0.00001 and about 1.0 wt %, such as between about 0.002 and about 0.5 wt %, such as between about 0.003 and about 0.2 wt %, based upon the total weight of the composition. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more.

Diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadiene, vinylnorbomene, norbornadiene, ethylidene norbornene, divinylbenzene, dicyclopentadiene or higher ring containing diolefins with or without substituents at various ring positions.

In at least one embodiment, where butene is the comonomer, the butene source may be a mixed butene stream comprising various isomers of butene. The 1-butene monomers are expected to be preferentially consumed by the polymerization process as compared to other butene monomers. Use of such mixed butene streams will provide an economic benefit, as these mixed streams are often waste streams from refining processes, for example, $C_4$ raffinate streams, and can therefore be substantially less expensive than pure 1-butene.

Polymerization processes of the present disclosure can be carried out in any suitable manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is preferably a process where at least about 90 wt % of the product is soluble in the reaction media.) A bulk homogeneous process is particularly preferred. (A bulk process is preferably a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is used and monomers are polymerized on the supported catalyst particles. At least 95 wt % of polymer products derived from the supported catalyst are in granular form as solid particles (not dissolved in the diluent).

Suitable diluents/solvents for polymerization include noncoordinating, inert liquids. Non-limiting examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof. In another embodiment, the solvent is not aromatic, and aromatics are present in the solvent at less than about 1 wt %, such as less than about 0.5 wt %, such as about 0 wt % based upon the weight of the solvents.

In at least one embodiment, the feed concentration of the monomers and comonomers for the polymerization is about 60 vol % solvent or less, preferably about 40 vol % or less, or about 20 vol % or less, based on the total volume of the feedstream. Preferably the polymerization is run in a bulk process.

Preferred polymerizations can be run at any temperature and/or pressure suitable to obtain the desired polyolefins. Typical temperatures and/or pressures include a temperature between about 0° C. and about 300° C., such as between about 20° C. and about 200° C., such as between about 35° C. and about 150° C., such as between about 40° C. and about 120° C., such as between about 45° C. and about 80° C.; and at a pressure between about 0.35 MPa and about 10 MPa, such as between about 0.45 MPa and about 6 MPa, or preferably between about 0.5 MPa and about 4 MPa.

In a typical polymerization, the run time of the reaction is up to about 300 minutes, such as between about 5 and about 250 minutes, such as between about 10 and about 120 minutes.

In at least one embodiment, hydrogen is present in the polymerization reactor at a partial pressure of between about 0.001 and 50 psig (0.007 to 345 kPa), such as between about 0.01 and about 25 psig (0.07 to 172 kPa), such as between about 0.1 and 10 psig (0.7 to 70 kPa).

Gas Phase Polymerization

In a useful embodiment, the catalyst system described herein is used in a gas polymerization. Generally, in a fluidized gas bed process used for producing polymers, a gaseous stream containing one or more monomers is continuously cycled through a fluidized bed in the presence of a catalyst system described herein under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

In a useful embodiment, the catalyst system described herein is used in a slurry phase polymerization. A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalyst system as described herein, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process should be operated above the reaction diluent critical temperature and pressure. Preferably, a hexane or an isobutane medium is employed.

In an alternate embodiment, the activity of the catalyst system described herein is at least about 50 g/mmol/hour, such as about 500 or more g/mmol/hour, such as about 5,000 or more g/mmol/hr, such as about 50,000 or more g/mmol/hr. In an alternate embodiment, the conversion of olefin monomer is at least about 10%, based upon polymer yield (weight) and the weight of the monomer entering the reaction zone, such as about 20% or more, such as about 30% or more, such as about 50% or more, such as about 80% or more.

In at least one embodiment, little or no alumoxane is used in the process to produce the polymers. Preferably, alumoxane is present at zero mol %. Alternatively, the alumoxane is present at a molar ratio of aluminum to transition metal of the catalyst represented by Formula (I) less than about 500:1, such as less than about 300:1, such as less than about 100:1, such as less than about 1:1.

In a preferred embodiment, little or no scavenger is used in the process to produce the polyolefin composition. Preferably, scavenger (such as tri alkyl aluminum) is present at zero mol %. Alternatively, the scavenger is present at a molar ratio of scavenger metal to transition metal of the catalyst represented by Formula (I) of less than about 100:1, such as less than about 50:1, such as less than about 15:1, such as less than about 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic or alicyclic hydrocarbons, such as cyclohexane, cycloheptane, methylcyclohexane, methylcycloheptane, or mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 0.5 mol % alumoxane, preferably 0 mol % alumoxane. Alternatively, the alumoxane is present at a molar ratio of aluminum to transition metal of the catalyst represented by Formula (I) less than 500:1, preferably less than 300:1, preferably less than 100:1, preferably less than 1:1; 5) the polymerization preferably occurs in one reaction zone; 6) the productivity of the catalyst system is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mol %. Alternatively, the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone", also referred to as a "polymerization zone", is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is about 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also relates to polyolefin compositions, such as resins, produced by the catalyst compound represented by Formula (I) and the methods described herein.

In at least one embodiment, a process includes utilizing the catalyst compound represented by Formula (I) to produce propylene homopolymers or propylene copolymers, such as propylene-ethylene and/or propylene-alphaolefin (preferably C3 to C20) copolymers (such as propylene-hexene copolymers or propylene-octene copolymers) having an Mw/Mn of greater than about 1, such as greater than about 2, such as greater than about 3, such as great than about 4.

In at least one embodiment, a process includes utilizing the catalyst compound represented by Formula (I) to produce olefin polymers, preferably polyethylene and polypropylene homopolymers and copolymers. In one embodiment, the polymers produced herein are homopolymers of ethylene or copolymers of ethylene preferably having between about 0 and 25 mole % of one or more $C_3$ to $C_{20}$ olefin comonomer (such as between about 0.5 and 20 mole %, such as between about 1 and about 15 mole %, such as between about 3 and about 10 mole %). Olefin comonomers may be $C_3$ to $C_{12}$ alpha-olefins, such as one or more of propylene, butene, hexene, octene, decene, dodecene, preferably propylene, butene, hexene, octene. In one embodiment, the polymers produced herein are copolymers of propylene that may have between about 0 and about 25 mole % (such as between about 0.5 and about 20 mole %, such as between about 1 and about 15 mole %, such as between about 3 and about 10 mole %) of one or more of $C_2$ or $C_4$ to $C_{20}$ olefin comonomer. Olefin monomers may be one or more of ethylene or $C_4$ to $C_{12}$ alpha-olefin, preferably ethylene, butene, hexene, octene, decene, dodecene, preferably ethylene, butene, hexene, octene.

In a preferred embodiment, the monomer is ethylene and the comonomer is hexene, preferably between about 1 and about 15 mole % hexene, such as between about 1 and about 10 mole %.

Polymers produced herein may have an Mw of between about 5,000 and about 1,000,000 g/mol (such as between about 25,000 and about 750,000 g/mol, such as between about 50,000 and about 500,000 g/mol), and/or an Mw/Mn of between about 1 and about 40 (such as between about 1.2 and about 20, such as between about 1.3 and about 10, such as between about 1.4 and about 5, such as between about 1.5 and about 4, such as between about 1.5 and about 3).

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In a preferred embodiment, the polymer produced herein has a branching index, (g'), of 0.90 or more, alternately 0.95 or more, alternately 0.98 or more.

Unless otherwise indicated Mw, Mn, branching index, (g'), and MWD are determined by GPC as described in US 2006/0173123 page 24-25, paragraphs [0334] to [0341] and the references cited therein, and are determined using polyethylene standards.

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al., J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at between about 10 and about 99 wt %, based upon the weight of total polymers in the blend, such as between about 20 and about 95 wt %, such as between about 30 and about 90 wt %, such as between about 40 and about 90 wt %, such as between about 50 and about 90 wt %, such as between about 60 and about 90 wt %, such as between about 70 and about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

In at least one embodiment, a polyolefin composition that is a multi-modal polyolefin composition comprises a low molecular weight fraction and/or a high molecular weight fraction. The low molecular weight fraction may be a high density fraction (such as HDPE), preferably present at at least 10 wt %, based upon the weight of the polyolefin. The high molecular weight fraction may be a low density fraction (such as LDPE, preferably LLDPE) preferably present at at least 10 wt %, based upon the weight of the polyolefin. In at least one embodiment, the low molecular weight fraction is produced by the catalyst compound represented by Formula (I). The high molecular weight fraction may be produced by a second catalyst compound that is a bridged or unbridged metallocene catalyst compound other than the catalyst compound represented by Formula (I), as described above. The low molecular weight fraction may be polypropylene or polyethylene. The high molecular weight fraction may be polypropylene or polyethylene, such as linear low density polyethylene.

In at least one embodiment, the low molecular weight fraction produced by the catalyst compound represented by Formula (I) has a low comonomer content. As used herein, "low comonomer content" is defined as a polyolefin having 6 wt % or less of comonomer based upon the total weight of the polyolefin. The high molecular weight fraction produced by the second catalyst compound may have a high comonomer content. As used herein, "high comonomer content" is defined as a polyolefin having greater than 6 wt % of comonomer based upon the total weight of the polyolefin.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 μm may be suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

EXAMPLES

The following abbreviations may be used below: eq. means equivalents.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.

SMAO used below was prepared according to the description "Preparation of SMAO for ES™757 Silica" above.

Fluorided silica, F—Si, used below was prepared according to the description "Fluorided Supported Catalysts" above.

Products were Characterized as Follows:

$^1$H NMR

Unless otherwise indicated, $^1$H NMR data of non-polymeric compounds was collected at room temperature in a 5 mm probe using either a Bruker or Varian NMR spectrometer operating with a $^1$H frequency of 400 or 500 MHz. Data was recorded using a 30° flip angle RF pulse, 8 scans, with a delay of 5 seconds between pulses. Samples were prepared using approximately 5-10 mg of compound dissolved in approximately 1 mL of an appropriate deuterated solvent, as listed in the experimental examples. Samples are referenced to residual protium of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers was recorded in a 5 mm probe on a Varian NMR spectrometer at 120° C. using a $d_2$-1,1,2,2-tetrachloroethane solution prepared from approximately 20 mg of polymer and 1 mL of solvent. Unless stated otherwise, data was recorded using a 30° flip angle RF pulse, 120 scans, with a delay of 5 seconds between pulses.

High Throughput—Polymerizations:

Solvents, polymerization grade toluene and isohexane were supplied by ExxonMobil Chemical Company and thoroughly dried and degassed prior to use. Polymerization grade ethylene (custom tanks of ethylene with 300 ppm $H_2$ supplied by Air Liquide) was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) was used as a 2 mmol/L solution in toluene.

Reactor Description and Preparation: Polymerizations were conducted in an inert atmosphere ($N_2$) using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves were prepared by purging with dry nitrogen prior to use.

Differential Scanning Calorimetry (DSC) measurements were performed on a TA-Q200 instrument to determine the melting point of the polymers. Samples were pre-annealed at 220° C. for 15 minutes (nitrogen purged) and then allowed to cool to room temperature overnight. The samples were then heated to 220° C. at a rate of 100° C./minute and then cooled at a rate of 50° C./minute. Melting points were collected during the heating period (second melt).

Ethylene/1-Hexene Copolymerization

The reactor was prepared as described above, and then purged with ethylene. Isohexane and 1-hexene were added via syringe at room temperature and atmospheric pressure. The reactor was then brought to process temperature (85° C.) and charged with ethylene to process pressure (130 psig=896 kPa) while stirring at 800 RPM. 450 microliters of supported catalyst system (prepared as described above under "Synthesis of Supported Catalysts") was placed into reactor at temperature containing desired amount of hexene (150 microliters). Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 300 ppm $CO_2$ to the autoclaves for approximately 30 seconds. The polymerizations were quenched after a predetermined cumulative amount of ethylene had been added or for a maximum of 45 minutes polymerization time. The reactors were cooled and vented. The polymer was isolated after the solvent was removed in-vacuo. The data are reported in FIGS. 1 to 6. Activity is reported in the figures as g/g'hr=grams of polymer/grams of supported catalyst/hour.

FIG. 1 is a plot 100 of activity versus hexene concentration (mol/L) in the feed based on total monomer concentration in the feed. As shown in FIG. 1, catalyst compound (1,3-dimethyl benz[e]indenyl)($CpMe_4$)$ZrMe_2$ on SMAO support (stars) provides an activity of about 1,500 g/g'hr at 0 mol/L hexene and about 3,800 at about 0.22 mol/L hexene. Catalyst compound (1,3-dimethyl benz[e]indenyl)($CpMe_4$)$ZrMe_2$ on fluorided support (triangles) provides an activity of 1,900 g/g'hr at 0 mol/L hexene, between about 3,050 and about 3,250 at 0.12 mol/L hexene, and about 1,000 at 0.22 mol/L hexene. Catalyst compound 1,3-dimethyl benz[e]indenyl($CpMe_4$)$ZrCl_2$ on SMAO support (squares) provides an activity of about 1,950 g/g'hr at 0 mol/L hexene, about 2,700 at 0.12 mol/L hexene, and about 3,050 at about 0.22 mol/L hexene. These catalysts have better activity as compared to catalyst compound ($CpMe_4$)(n-PrCp)$ZrCl_2$ on SMAO support (hexagons). As a comparative example, catalyst compound (1-ethylindenyl)$_2ZrMe_2$ on SMAO support (circles) provides an activity of about 900 g/g'hr at 0 mol/L hexene, about 1,000 at 0.12 mol/L hexene, and about 1,200 at about 0.22 mol/L hexene.

Figure 2:
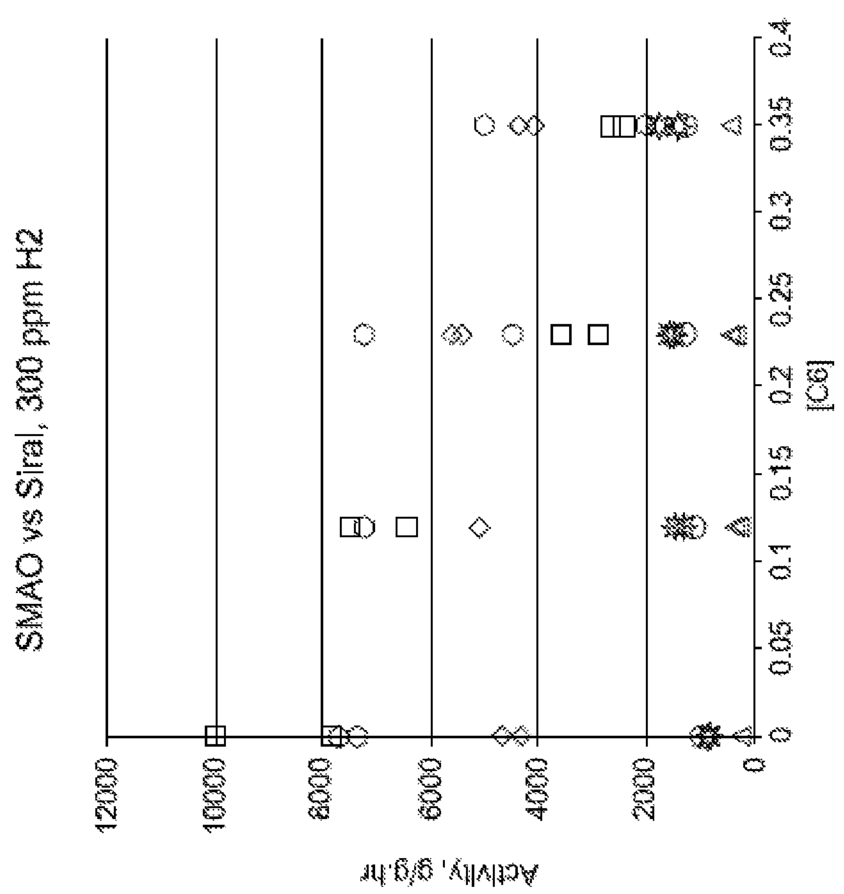
FIG. 2 is a plot of activity versus hexene concentration based on total monomer concentration.

FIG. 2 is a plot 200 of activity versus hexene concentration (mol/L) in the feed based on total monomer concentration in the feed. As shown in FIG. 2, catalyst compound (1,3-dimethyl benz[e]indenyl)($CpMe_5$)$ZrMe_2$ on fluorided support (triangles) provides an activity of about 200 g/g'hr at 0 mol/L hexene, about 200 at 0.12 mol/L hexene, about 300 at 0.22 mol/L hexene, and about 400 at 0.35 mol/L hexene. Catalyst compound (1,3-dimethyl benz[e]indenyl)($CpMe_5$)$ZrMe_2$ on SMAO support (stars) provides an activity of about 400 g/g'hr at 0 mol/L hexene, about 1,500 at 0.12 mol/L hexene, about 1,800 at 0.22 mol/L hexene, and about 1,900 at 0.35 mol/L hexene. These catalysts each provide higher activity as compared to catalyst compound (n-PrCp)$_2HfMe_2$ on SMAO support (diamonds). As comparative examples, (3-n-propyl Cp)$_2HfMe_2$ on fluorided support (squares) provides an activity of between about 8,000 and about 10,000 g/g'hr at 0 mol/L hexene, between about 6,500 and about 7,500 at 0.12 mol/L hexene, between about 2,400 and about 2,800 at 0.22 mol/L hexene, and about 2,200 at 0.35 mol/L hexene. (3-n-propyl Cp)$_2HfMe_2$ on SMAO support (hexagons) provides an activity of about 7,800 g/g'hr at 0 mol/L hexene, about 7,700 at 0.12 mol/L hexene, between about 4,200 and about 7,700 at 0.22 mol/L hexene, and between about 2,000 and about 4,500 at 0.35 mol/L hexene. Catalyst compound (1-ethylindenyl)$_2ZrMe_2$ on SMAO support (circles) provides an activity of about 900 g/g'hr at 0 mol/L hexene, about 1,000 at 0.12 mol/L hexene, about 1,200 at 0.22 mol/L hexene, and about 1,400 at 0.35 mol/L hexene.

Figure 3:
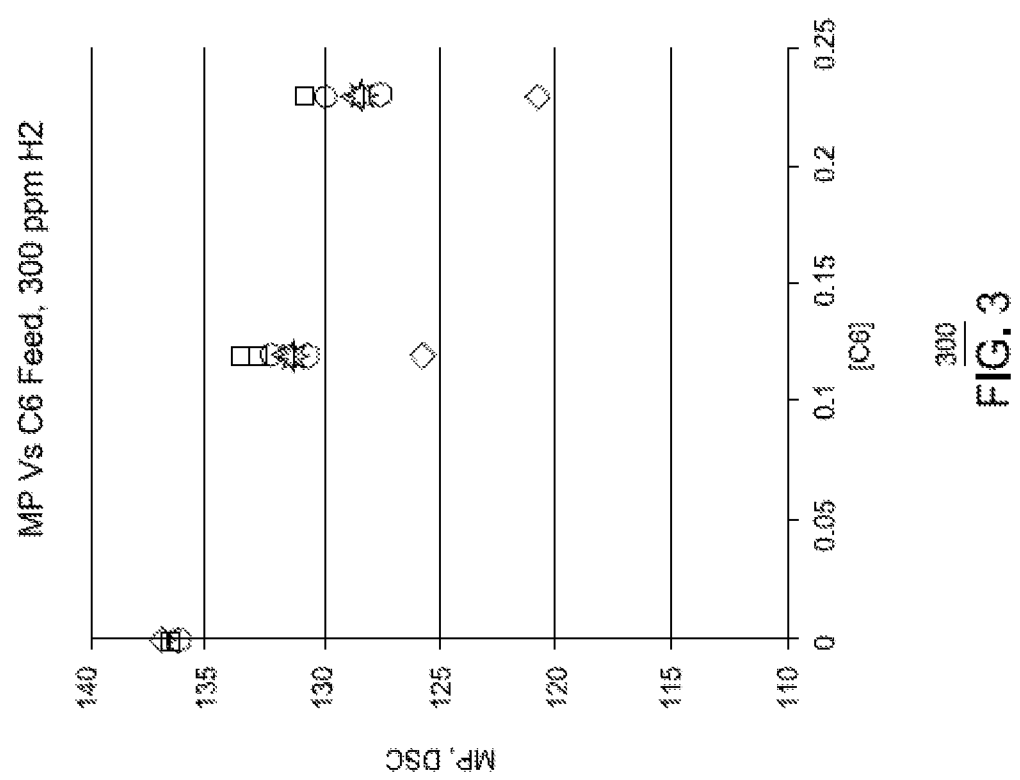
FIG. 3 is a plot of melting points of ethylene-hexene copolymer products versus hexene concentration in the feed.

FIG. 3 is a plot 300 of melting points of ethylene-hexene copolymer products versus hexene concentration (mol/L) in the feed based on total monomer concentration in the feed. As shown in FIG. 3, melting points of copolymers formed from the catalysts decrease with increasing hexene concentration for all catalyst systems tested: (1,3-dimethyl benz[e]indenyl)($CpMe_4$)$ZrMe_2$ on SMAO support (stars); (1,3-dimethyl benz[e]indenyl)($CpMe_4$)$ZrMe_2$ on fluorided support (triangles); (1-ethylindenyl)$_2ZrMe_2$ on SMAO support (circles); and (1,3-dimethyl benz[e]indenyl)($CpMe_4$)$ZrCl_2$ on SMAO support (squares).

Figure 4:
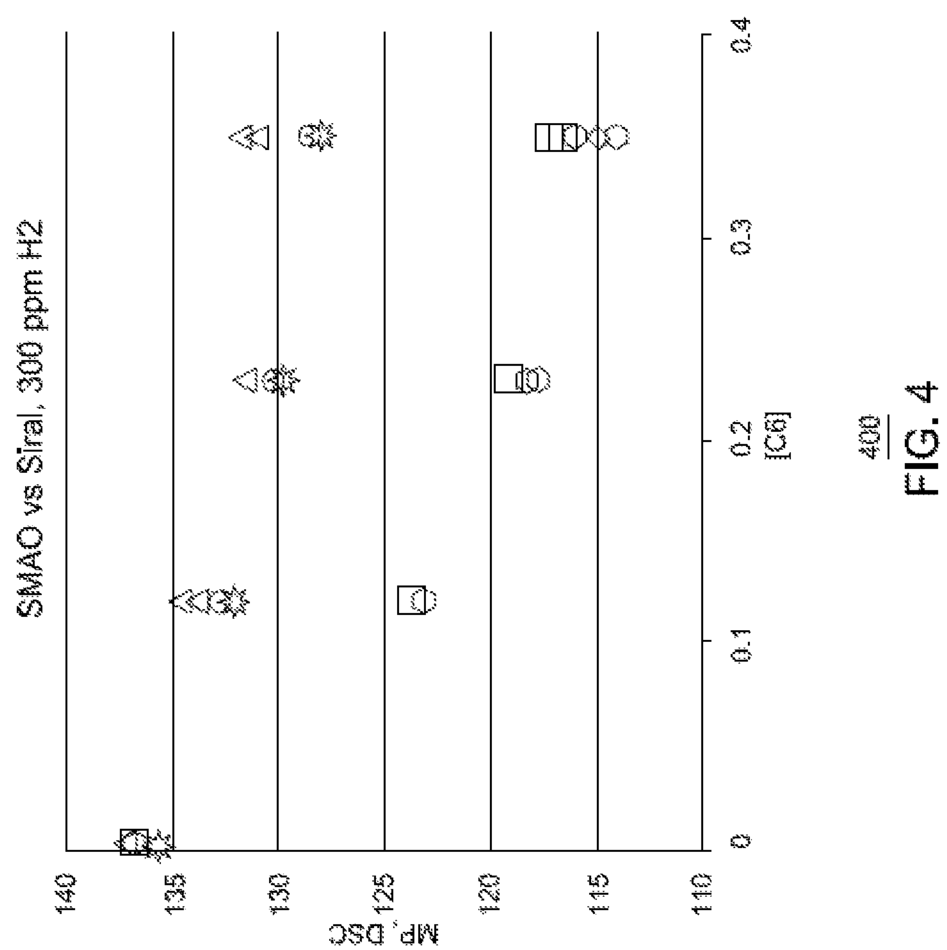
FIG. 4 is a plot of melting points of ethylene-hexene copolymer products versus hexene concentration in the feed.

FIG. 4 is a plot 400 of melting points of ethylene-hexene copolymer products versus hexene concentration (mol/L) in the feed based on total monomer concentration in the feed. As shown in FIG. 4, melting points of polymers formed from the catalysts decrease with increasing hexene concentration for all catalyst systems tested: (1,3-dimethyl benz[e]indenyl)($CpMe_5$)$ZrMe_2$ on fluorided support (triangles); (1,3-dimethyl benz[e]indenyl)($CpMe_5$)$ZrMe_2$ on SMAO support (stars); (1-ethylindenyl)$_2ZrMe_2$ on SMAO support (circles); (3-n-propyl Cp)$_2HfMe_2$ on fluorided support (squares); and (3-n-propyl Cp)$_2HfMe_2$ on SMAO support (hexagons).

Figure 5:
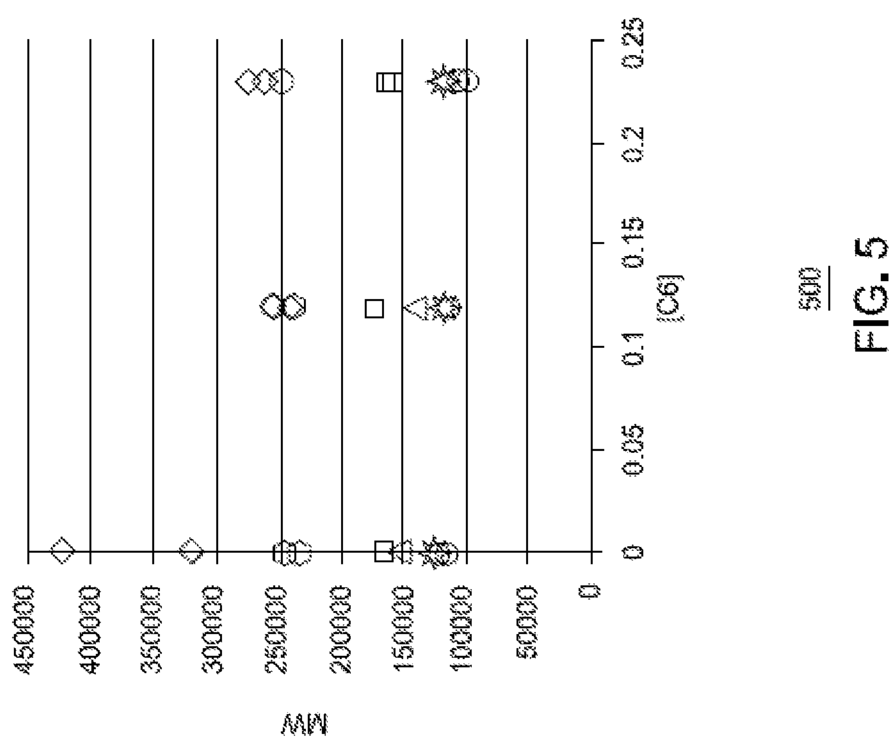
FIG. 5 is a plot of Mw of ethylene-hexene copolymer products versus hexene concentration in the feed.

FIG. 5 is a plot 500 of weight average molecular weight, Mw, of the ethylene-hexene copolymer products versus hexene concentration (mol/L) in the feed based on total monomer concentration in the feed. As shown in FIG. 5, catalyst compound (1,3-dimethyl benz[e]indenyl)($CpMe_4$)$ZrMe_2$ on SMAO support (stars) provides MW values of about 125,000 g/mol at 0 mol/L hexene, about 120,000 g/mol at 0.12 mol/L hexene, and about 110,000 g/mol at 0.22 mol/L hexene. Catalyst compound (1,3-dimethyl benz[e]indenyl)($CpMe_4$)$ZrMe_2$ on fluorided support (triangles) provides MW values of about 150,000 g/mol at 0 mol/L hexene, about 140,000 g/mol at 0.12 mol/L hexene, and about 115,000 g/mol at 0.22 mol/L hexene. Catalyst compound (1,3-dimethyl benz[e]indenyl)($CpMe_4$)$ZrCl_2$ on SMAO support (squares) provides MW values of about 160,000 g/mol at 0 mol/L hexene, about 160,000 g/mol at 0.12 mol/L hexene, and about 160,000 g/mol at about 0.22 mol/L hexene. These catalysts each provide low molecular weight polymers as compared to catalyst compound ($CpMe_4$)(n-PrCp)$ZrCl_2$ on SMAO support (hexagons) and (n-PrCp)$_2HfMe_2$ on SMAO support (diamonds). Furthermore, catalyst compound (1-ethylindenyl)$_2ZrMe_2$ on SMAO support (circles) provides MW values of about 125,000 g/mol at 0 mol/L hexene, about 110,000 g/mol at 0.12 mol/L hexene, and about 100,000 g/mol at about 0.22 mol/L hexene.

Figure 6:
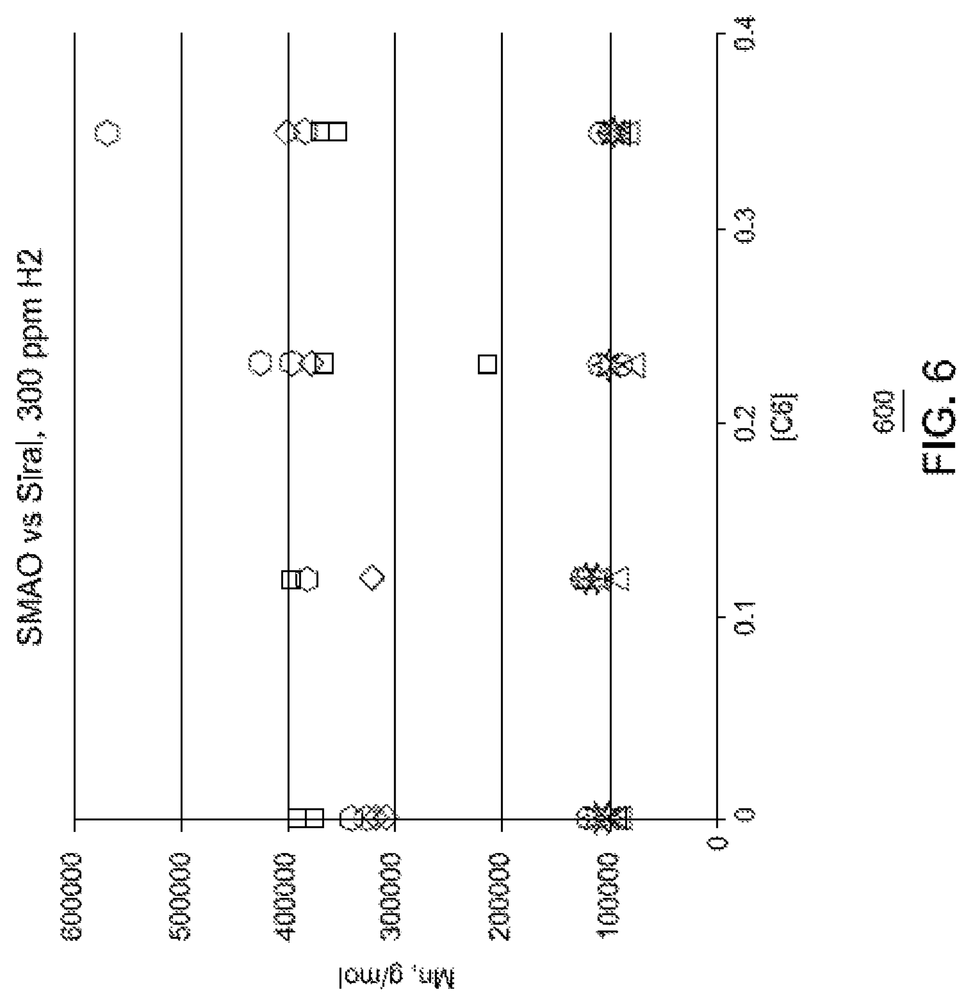
FIG. 6 is a plot of Mn of ethylene-hexene copolymer products versus hexene concentration in the feed.

FIG. 6 is a plot 600 of number average molecular weight (Mn) values of ethylene-hexene copolymer products versus hexene concentration (mol/L) in the feed based on total monomer concentration in the feed. As shown in FIG. 6, catalyst compound (1,3-dimethyl benz[e]indenyl)($CpMe_5$)

$ZrMe_2$ on fluorided support (triangles) provides Mn values of about 90,000 g/mol at 0 mol/L hexene, about 95,000 g/mol at 0.12 mol/L hexene, about 90,000 g/mol at 0.22 mol/L hexene, and about 90,000 g/mol at 0.35 mol/L hexene. Catalyst compound (1,3-dimethyl benz[e]indenyl)($CpMe_5$) $ZrMe_2$ on SMAO support (stars) provides Mn values of about 105,000 g/mol at 0 mol/L hexene, about 110,000 g/mol at 0.12 mol/L hexene, about 100,000 g/mol at 0.22 mol/L hexene, and about 98,000 g/mol at 0.35 mol/L hexene. These catalysts each provide polymers having lower Mn values as compared to catalyst compound $(n\text{-}PrCp)_2HfMe_2$ on SMAO support (diamonds). Furthermore, catalyst compound $(1\text{-ethylindenyl})_2ZrMe_2$ on SMAO support (circles) provides Mn values of about 115,000 g/mol at 0 mol/L hexene, about 120,000 g/mol at 0.12 mol/L hexene, between about 95,000 g/mol and about 105,000 g/mol at 0.22 mol/L hexene, and about 100,000 g/mol at 0.35 mol/L hexene. $(3\text{-n-propyl Cp})_2HfMe_2$ on fluorided support (squares) provides Mn values of between about 390,000 g/mol at 0 mol/L hexene, about 395,000 g/mol at 0.12 mol/L hexene, about 375,000 at 0.22 mol/L hexene, and about 375,000 g/mol at 0.35 mol/L hexene. $(3\text{-n-propyl Cp})_2HfMe_2$ on SMAO support (hexagons) provides Mn values of about 330,000 g/mol at 0 mol/L hexene, about 390,000 g/mol at 0.12 mol/L hexene, between about 395,000 g/mol and about 415,000 g/mol at 0.22 mol/L hexene, and about 390,000 g/mol at 0.35 mol/L hexene.

These data illustrate, for example, that catalysts represented by Formula (I) provide linear low molecular weight ethylene polymers under polymerization conditions. Catalysts represented by Formula (I) are useful in catalyst systems that include one or more second catalysts that provide less-linear, low density, high molecular weight polyolefins and corresponding copolymers. These data indicate that catalysts represented by Formula (I) provide linear low molecular weight polyethylene and linear low molecular weight polyethylene copolymers under substantially similar polymerization conditions that one or more second catalysts can provide less-linear, low density, high molecular weight polyethylene and corresponding copolymers. In at least one embodiment, such orthogonality is advantageous because the catalysts represented by Formula (I) do not interfere with polymerization of the one or more second catalysts in a mixed catalyst system. Such catalyst systems provide BOCD compositions, such as resins, with improved physical properties. The BOCD compositions can provide films having improved stiffness/toughness, improved mechanical balance, and are easier to fabricate. Furthermore, such catalyst systems provide cost savings for manufacturing of polyolefin compositions as compared to conventional manufacturing processes.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A catalyst system comprising an activator, a fluorided silica support, and a catalyst compound represented by Formula (I):

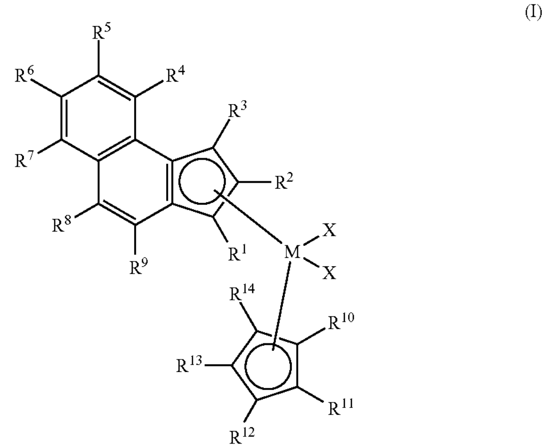

wherein M is Zr, each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, a halocarbyl or a silylcarbyl, wherein at least one of $R^1$ and $R^3$ is a linear or branched $C_1$-$C_{10}$ substituted or unsubstituted hydrocarbyl, and each X is independently a halide or a $C_1$-$C_{50}$ substituted or unsubstituted hydrocarbyl, a hydride, an amide, an alkoxide, a sulfide, a phosphide, a halide, a diene, an amine, a phosphine, an ether, or a combination thereof wherein two Xs are optionally joined together to form a metallocycle ring, or two Xs are optionally joined to form a chelating ligand, a diene ligand, or an alkylidene.

2. The catalyst system of claim 1, wherein $R^1$ is a linear or branched $C_1$-$C_{10}$ substituted or unsubstituted hydrocarbyl.

3. The catalyst system of claim 1, wherein $R^3$ is a linear or branched $C_1$-$C_{10}$ substituted or unsubstituted hydrocarbyl.

4. The catalyst system of claim 1, wherein each of $R^1$ and $R^3$ is independently a linear or branched $C_1$-$C_5$ unsubstituted hydrocarbyl.

5. The catalyst system of claim 1, wherein each X is independently a halide or a $C_1$-$C_{10}$ substituted or unsubstituted hydrocarbyl.

6. The catalyst system of claim 1, wherein $R^{10}$ is hydrogen or a $C_1$-$C_{10}$ substituted or unsubstituted hydrocarbyl, and wherein each of $R^{11}$, $R^{12}$, $R^{13}$, and $R^{14}$ is independently a $C_1$-$C_{10}$ substituted or unsubstituted hydrocarbyl.

7. A catalyst system comprising an activator, a fluorided silica support, and a catalyst compound represented by Formula (I):

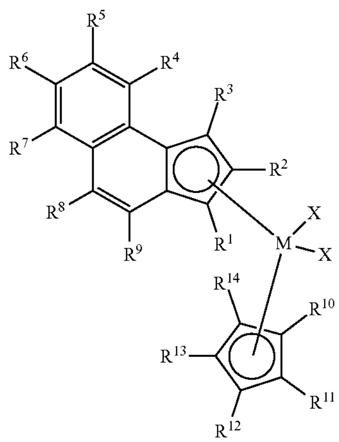

wherein M is Zr, each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, a halocarbyl or a silylcarbyl, wherein at least one of $R^1$ and $R^3$ is not hydrogen, and each X is independently a halide or a $C_1$-$C_{50}$ substituted or unsubstituted hydrocarbyl, a hydride, an amide, an alkoxide, a sulfide, a phosphide, a halide, a diene, an amine, a phosphine, an ether, or a combination thereof wherein two Xs are optionally joined together to form a metallocycle ring, or two Xs are optionally joined to form a chelating ligand, a diene ligand, or an alkylidene, where the support material has been slurried in a non-polar solvent and the resulting slurry was first contacted with the activator for a period of time between about 0.5 hours and about 24 hours, isolated, and then contacted with a solution of at least one catalyst compound represented by Formula (I).

8. The catalyst system of claim 1, wherein $R^1$ is linear or branched $C_1$-$C_{10}$ substituted or unsubstituted hydrocarbyl; $R^3$ is a linear or branched $C_1$-$C_{10}$ substituted or unsubstituted hydrocarbyl; each X is independently a halide or a $C_1$-$C_{10}$ substituted or unsubstituted hydrocarbyl; and $R^{10}$ is hydrogen or a $C_1$-$C_{10}$ substituted or unsubstituted hydrocarbyl, and wherein each of $R^{11}$, $R^{12}$, $R^{13}$, and $R^{14}$ is independently a $C_1$-$C_{10}$ substituted or unsubstituted hydrocarbyl.

9. The catalyst system of claim 1, wherein the support material is slurried in a non-polar solvent and the resulting slurry is contacted with the activator for a period of time from about 0.5 hours to about 24 hours, then is contacted with a solution of the catalyst compound.

10. The catalyst system of claim 1, wherein the activator comprises an alumoxane.

11. The catalyst system of claim 7, wherein the slurry is contacted with the activator for a period of time from about 2 hours to about 16 hours.

12. The catalyst system of claim 7, wherein the slurry is contacted with the activator for a period of time from about 2 hours to about 8 hours.

13. The catalyst system of claim 7, wherein the non-polar solvent is selected from the group consisting of: alkanes and cycloalkanes.

14. The catalyst system of claim 7, wherein the non-polar solvent is selected from the group consisting of: isopentane, hexane, n-heptane, octane, nonane, decane, and cyclohexane.

15. The catalyst system of claim 7, wherein the non-polar solvent is selected from the group consisting of: alkanes and cycloalkanes.

16. A catalyst system comprising an activator, a fluorided silica support, and a catalyst compound represented by Formula (I):

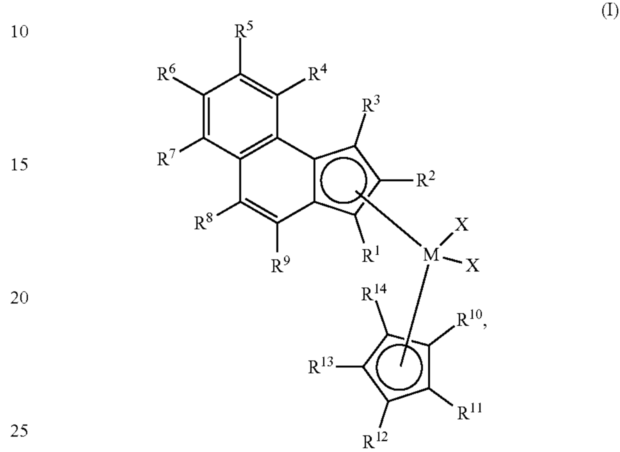

wherein M is Zr, each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently hydrogen, or a linear or branched $C_1$-$C_{50}$ substituted or unsubstituted hydrocarbyl, a halocarbyl or a silylcarbyl, wherein at least one of $R^1$ and $R^3$ is not hydrogen, and each X is independently a halide or a $C_1$-$C_{50}$ substituted or unsubstituted hydrocarbyl, a hydride, an amide, an alkoxide, a sulfide, a phosphide, a halide, a diene, or a combination thereof, wherein two Xs are optionally joined together to form a metallocycle ring, or two Xs may be joined to form a chelating ligand, a diene ligand, or an alkylidene.

17. The catalyst system of claim 16, wherein $R^1$ is a linear or branched $C_1$-$C_{10}$ substituted or unsubstituted hydrocarbyl.

18. The catalyst system of claim 16, wherein $R^3$ is a linear or branched $C_1$-$C_{10}$ substituted or unsubstituted hydrocarbyl.

19. The catalyst system of claim 16, wherein each of $R^1$ and $R^3$ is independently a linear or branched $C_1$-$C_5$ unsubstituted hydrocarbyl.

20. The catalyst system of claim 16, wherein each X is independently a halide or a $C_1$-$C_{10}$ substituted or unsubstituted hydrocarbyl.

21. The catalyst system of claim 16, wherein $R^{10}$ is hydrogen or a $C_1$-$C_{10}$ substituted or unsubstituted hydrocarbyl, and wherein each of $R^{11}$, $R^{12}$, $R^{13}$, and $R^{14}$ is independently a $C_1$-$C_{10}$ substituted or unsubstituted hydrocarbyl.

22. The catalyst system of claim 16, wherein $R^1$ is a linear or branched $C_1$-$C_{10}$ substituted or unsubstituted hydrocarbyl; $R^3$ is a linear or branched $C_1$-$C_{10}$ substituted or unsubstituted hydrocarbyl; each X is independently a halide or a $C_1$-$C_{10}$ substituted or unsubstituted hydrocarbyl; and $R^{10}$ is hydrogen or a $C_1$-$C_{10}$ substituted or unsubstituted hydrocarbyl, and wherein each of $R^{11}$, $R^{12}$, $R^{13}$, and $R^{14}$ is independently a $C_1$-$C_{10}$ substituted or unsubstituted hydrocarbyl.

23. The catalyst system of claim 16, wherein the support material is slurried in a non-polar solvent and the resulting slurry is contacted with the activator for a period of time from about 0.5 hours to about 24 hours, then is contacted with a solution of the catalyst compound.

24. The catalyst system of claim 16, wherein the activator comprises an alumoxane.

25. The catalyst system of claim 23, wherein the slurry is contacted with the activator for a period of time from about 2 hours to about 16 hours.

26. The catalyst system of claim 23, wherein the slurry is contacted with the activator for a period of time from about 2 hours to about 8 hours.

27. The catalyst system of claim 23, wherein the non-polar solvent is selected from the group consisting of: isopentane, hexane, n-heptane, octane, nonane, decane, cyclohexane, benzene, toluene, and ethylbenzene.

28. The catalyst system of claim 23, wherein the non-polar solvent is selected from the group consisting of: isopentane, hexane, n-heptane, octane, nonane, decane, and cyclohexane.

29. The catalyst system of claim 23, wherein the non-polar solvents are selected from the group consisting of: alkanes and cycloalkanes.

30. The catalyst of claim 7 wherein the support has a surface area of 300 to 700 $m^2/g$ and a pore volume of 1.65 to 3.0 cc/g.

31. The catalyst system of claim 1, wherein the catalyst compound represented by Formula (I) comprises one or more of:

(1,3-$Me_2$-benz[e]indenyl)($Me_5$cyclopentadienyl)$ZrCl_2$; (1-Me-benz[e]indenyl)($Me_5$cyclopentadienyl)$ZrCl_2$; (1-Me-benz[e]indenyl)($Me_4$cyclopentadienyl)$ZrCl_2$;

(1,3-$Me_2$-benz[e]indenyl)($Me_5$cyclopentadienyl)$ZrMe_2$; (1-Me-benz[e]indenyl)($Me_5$cyclopentadienyl)$ZrMe_2$; (1-Me-benz[e]indenyl)($Me_4$cyclopentadienyl)$ZrMe_2$;

(1,3-$Et_2$-benz[e]indenyl)($Me_5$cyclopentadienyl)$ZrCl_2$; (1-Et-benz[e]indenyl)($Me_5$cyclopentadienyl)$ZrCl_2$; (1-Et-benz[e]indenyl)($Me_4$cyclopentadienyl)$ZrCl_2$;

(1,3-$Et_2$-benz[e]indenyl)($Me_5$cyclopentadienyl)$ZrMe_2$; (1-Et-benz[e]indenyl)($Me_5$cyclopentadienyl)$ZrMe_2$; (1-Et-benz[e]indenyl)($Me_4$cyclopentadienyl)$ZrMe_2$;

(1,3-n-$Pr_2$-benz[e]indenyl)($Me_5$cyclopentadienyl)$ZrCl_2$; (1-n-Pr-benz[e]indenyl)($Me_5$cyclopentadienyl)$ZrCl_2$; (1-n-Pr-benz[e]indenyl)($Me_4$cyclopentadienyl)$ZrCl_2$;

(1,3-n-$Pr_2$-benz[e]indenyl)($Me_5$cyclopentadienyl)$ZrMe_2$; (1-n-Pr-benz[e]indenyl)($Me_5$cyclopentadienyl)$ZrMe_2$; (1-n-Pr-benz[e]indenyl)($Me_4$cyclopentadienyl)$ZrMe_2$;

(1,3-$Me_2$-benz[e]indenyl)($Me_4$cyclopentadienyl)$ZrCl_2$; (3-Me-benz[e]indenyl)($Me_5$cyclopentadienyl)$ZrCl_2$; (3-Me-benz[e]indenyl)($Me_4$cyclopentadienyl)$ZrCl_2$;

(1,3-$Me_2$-benz[e]indenyl)($Me_4$cyclopentadienyl)$ZrMe_2$; (3-Me-benz[e]indenyl)($Me_5$cyclopentadienyl)$ZrMe_2$; (3-Me-benz[e]indenyl)($Me_4$cyclopentadienyl)$ZrMe_2$;

(1,3-$Et_2$-benz[e]indenyl)($Me_4$cyclopentadienyl)$ZrCl_2$; (3-Et-benz[e]indenyl)($Me_5$cyclopentadienyl)$ZrCl_2$; (3-Et-benz[e]indenyl)($Me_4$cyclopentadienyl)$ZrCl_2$;

(1,3-$Et_2$-benz[e]indenyl)($Me_4$cyclopentadienyl)$ZrMe_2$; (3-Et-benz[e]indenyl)($Me_5$cyclopentadienyl)$ZrMe_2$; (3-Et-benz[e]indenyl)($Me_4$cyclopentadienyl)$ZrMe_2$;

(1,3-n-$Pr_2$-benz[e]indenyl)($Me_4$cyclopentadienyl)$ZrCl_2$; (3-n-Pr-benz[e]indenyl)($Me_5$cyclopentadienyl)$ZrCl_2$; (3-n-Pr-benz[e]indenyl)($Me_4$cyclopentadienyl)$ZrCl_2$;

(1,3-n-$Pr_2$-benz[e]indenyl)($Me_4$cyclopentadienyl)$ZrMe_2$; (3-n-Pr-benz[e]indenyl)($Me_5$cyclopentadienyl)$ZrMe_2$; and (3-n-Pr-benz[e]indenyl)($Me_4$cyclopentadienyl) $ZrMe_2$.

32. The catalyst system of claim 7, wherein the catalyst compound represented by Formula (I) comprises one or more of:

(1,3-$Me_2$-benz[e]indenyl)($Me_5$cyclopentadienyl)$ZrCl_2$; (1-Me-benz[e]indenyl)($Me_5$cyclopentadienyl)$ZrCl_2$; (1-Me-benz[e]indenyl)($Me_4$cyclopentadienyl)$ZrCl_2$;

(1,3-$Me_2$-benz[e]indenyl)($Me_5$cyclopentadienyl)$ZrMe_2$; (1-Me-benz[e]indenyl)($Me_5$cyclopentadienyl)$ZrMe_2$; (1-Me-benz[e]indenyl)($Me_4$cyclopentadienyl)$ZrMe_2$;

(1,3-$Et_2$-benz[e]indenyl)($Me_5$cyclopentadienyl)$ZrCl_2$; (1-Et-benz[e]indenyl)($Me_5$cyclopentadienyl)$ZrCl_2$; (1-Et-benz[e]indenyl)($Me_4$cyclopentadienyl)$ZrCl_2$;

(1,3-$Et_2$-benz[e]indenyl)($Me_5$cyclopentadienyl)$ZrMe_2$; (1-Et-benz[e]indenyl)($Me_5$cyclopentadienyl)$ZrMe_2$; (1-Et-benz[e]indenyl)($Me_4$cyclopentadienyl)$ZrMe_2$;

(1,3-n-$Pr_2$-benz[e]indenyl)($Me_5$cyclopentadienyl)$ZrCl_2$; (1-n-Pr-benz[e]indenyl)($Me_5$cyclopentadienyl)$ZrCl_2$; (1-n-Pr-benz[e]indenyl)($Me_4$cyclopentadienyl)$ZrCl_2$;

(1,3-n-$Pr_2$-benz[e]indenyl)($Me_5$cyclopentadienyl)$ZrMe_2$; (1-n-Pr-benz[e]indenyl)($Me_5$cyclopentadienyl)$ZrMe_2$; (1-n-Pr-benz[e]indenyl)($Me_4$cyclopentadienyl)$ZrMe_2$;

(1,3-$Me_2$-benz[e]indenyl)($Me_4$cyclopentadienyl)$ZrCl_2$; (3-Me-benz[e]indenyl)($Me_5$cyclopentadienyl)$ZrCl_2$; (3-Me-benz[e]indenyl)($Me_4$cyclopentadienyl)$ZrCl_2$;

(1,3-$Me_2$-benz[e]indenyl)($Me_4$cyclopentadienyl)$ZrMe_2$; (3-Me-benz[e]indenyl)($Me_5$cyclopentadienyl)$ZrMe_2$; (3-Me-benz[e]indenyl)($Me_4$cyclopentadienyl)$ZrMe_2$;

(1,3-$Et_2$-benz[e]indenyl)($Me_4$cyclopentadienyl)$ZrCl_2$; (3-Et-benz[e]indenyl)($Me_5$cyclopentadienyl)$ZrCl_2$; (3-Et-benz[e]indenyl)($Me_4$cyclopentadienyl)$ZrCl_2$;

(1,3-$Et_2$-benz[e]indenyl)($Me_4$cyclopentadienyl)$ZrMe_2$; (3-Et-benz[e]indenyl)($Me_5$cyclopentadienyl)$ZrMe_2$; (3-Et-benz[e]indenyl)($Me_4$cyclopentadienyl)$ZrMe_2$;

(1,3-n-$Pr_2$-benz[e]indenyl)($Me_4$cyclopentadienyl)$ZrCl_2$; (3-n-Pr-benz[e]indenyl)($Me_5$cyclopentadienyl)$ZrCl_2$; (3-n-Pr-benz[e]indenyl)($Me_4$cyclopentadienyl)$ZrCl_2$;

(1,3-n-$Pr_2$-benz[e]indenyl)($Me_4$cyclopentadienyl)$ZrMe_2$; (3-n-Pr-benz[e]indenyl)($Me_5$cyclopentadienyl)$ZrMe_2$; and (3-n-Pr-benz[e]indenyl)($Me_4$cyclopentadienyl) $ZrMe_2$.

33. The catalyst system of claim 16, wherein the catalyst compound represented by Formula (I) comprises one or more of:

(1,3-$Me_2$-benz[e]indenyl)($Me_5$cyclopentadienyl)$ZrCl_2$; (1-Me-benz[e]indenyl)($Me_5$cyclopentadienyl)$ZrCl_2$; (1-Me-benz[e]indenyl)($Me_4$cyclopentadienyl)$ZrCl_2$;

(1,3-$Me_2$-benz[e]indenyl)($Me_5$cyclopentadienyl)$ZrMe_2$; (1-Me-benz[e]indenyl)($Me_5$cyclopentadienyl)$ZrMe_2$; (1-Me-benz[e]indenyl)($Me_4$cyclopentadienyl)$ZrMe_2$;

(1,3-$Et_2$-benz[e]indenyl)($Me_5$cyclopentadienyl)$ZrCl_2$; (1-Et-benz[e]indenyl)($Me_5$cyclopentadienyl)$ZrCl_2$; (1-Et-benz[e]indenyl)($Me_4$cyclopentadienyl)$ZrCl_2$;

(1,3-$Et_2$-benz[e]indenyl)($Me_5$cyclopentadienyl)$ZrMe_2$; (1-Et-benz[e]indenyl)($Me_5$cyclopentadienyl)$ZrMe_2$; (1-Et-benz[e]indenyl)($Me_4$cyclopentadienyl)$ZrMe_2$;

(1,3-n-$Pr_2$-benz[e]indenyl)($Me_5$cyclopentadienyl)$ZrCl_2$; (1-n-Pr-benz[e]indenyl)($Me_5$cyclopentadienyl)$ZrCl_2$; (1-n-Pr-benz[e]indenyl)($Me_4$cyclopentadienyl)$ZrCl_2$;

(1,3-n-$Pr_2$-benz[e]indenyl)($Me_5$cyclopentadienyl)$ZrMe_2$; (1-n-Pr-benz[e]indenyl)($Me_5$cyclopentadienyl)$ZrMe_2$; and (1-n-Pr-benz[e]indenyl)($Me_4$cyclopentadienyl) $ZrMe_2$.

* * * * *